(12) United States Patent
Im

(10) Patent No.: US 10,700,831 B2
(45) Date of Patent: Jun. 30, 2020

(54) WIRELESS COMMUNICATION SYSTEMS AND METHODS OF OPERATING THE SAME

(71) Applicant: Samsung Electronics Co., Ltd., Suwon-si, Gyeonggi-do (KR)

(72) Inventor: Se-Bin Im, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 348 days.

(21) Appl. No.: 15/603,893

(22) Filed: May 24, 2017

(65) Prior Publication Data

US 2018/0160404 A1    Jun. 7, 2018

(30) Foreign Application Priority Data

Dec. 6, 2016    (KR) .................. 10-2016-0165167

(51) Int. Cl.
*H04L 5/00* (2006.01)
*H04L 25/02* (2006.01)
*H04L 27/26* (2006.01)

(52) U.S. Cl.
CPC ............ *H04L 5/0048* (2013.01); *H04L 5/005* (2013.01); *H04L 5/0051* (2013.01); *H04L 25/0204* (2013.01); *H04L 25/0222* (2013.01); *H04L 25/0226* (2013.01); *H04L 25/0228* (2013.01); *H04L 25/0236* (2013.01); *H04L 5/0007* (2013.01); *H04L 5/0069* (2013.01); *H04L 27/2647* (2013.01)

(58) Field of Classification Search
CPC ..... H04L 5/0048; H04L 5/005; H04L 5/0051; H04L 5/0007; H04L 5/0069; H04L 27/2647; H04L 25/0204; H04L 25/0222; H04L 25/0226; H04L 25/0228; H04L 25/0236
USPC ........................................ 370/330
See application file for complete search history.

(56) References Cited

U.S. PATENT DOCUMENTS

| | | | |
|---|---|---|---|
| 6,404,826 B1 * | 6/2002 | Schmidl | H04B 1/7097 370/342 |
| 6,952,394 B1 | 10/2005 | Kim et al. | |
| 7,502,412 B2 | 3/2009 | Chen | |
| 8,135,436 B2 | 3/2012 | Mueck et al. | |
| 8,451,963 B2 | 5/2013 | Li et al. | |
| 8,509,291 B2 | 8/2013 | Seong et al. | |

(Continued)

FOREIGN PATENT DOCUMENTS

| | | |
|---|---|---|
| KR | 10-1086453 B1 | 11/2011 |
| KR | 10-2012-0036018 A | 4/2012 |
| KR | 10-1485183 B1 | 1/2015 |

*Primary Examiner* — Chi Tang P Cheng
(74) *Attorney, Agent, or Firm* — Harness, Dickey & Pierce, P.L.C.

(57) ABSTRACT

Provided are methods of operating a wireless communication system. The methods include determining first resource mapping patterns of a first physical channel used to generate virtual pilot signals so as to perform downlink channel estimation, based on state information of user equipment (UE) in every first period. The first physical channel is mapped onto resource elements adjacent to resource elements onto which pilot signals are mapped, in a time-frequency resource area (TFRA) of a downlink signal based on the determined first resource mapping patterns. A downlink signal of which resource mapping is completed is then transmitted to the UE.

20 Claims, 34 Drawing Sheets

(56) References Cited

U.S. PATENT DOCUMENTS

| | | | |
|---|---|---|---|
| 8,767,886 B2 | 7/2014 | Sezginer et al. | |
| 8,824,527 B2* | 9/2014 | Thompson | H04L 25/0212 370/252 |
| 9,083,572 B2 | 7/2015 | Kim et al. | |
| 2006/0190799 A1* | 8/2006 | Kan | H03M 13/1191 714/758 |
| 2010/0002788 A1* | 1/2010 | Wu | H04L 25/0232 375/260 |
| 2010/0240382 A1 | 9/2010 | Sampath et al. | |
| 2012/0087447 A1 | 4/2012 | Yoon et al. | |
| 2012/0176913 A1* | 7/2012 | Yoon | H04L 27/2657 370/242 |
| 2012/0321025 A1* | 12/2012 | Sezginer | H04L 25/022 375/346 |

\* cited by examiner

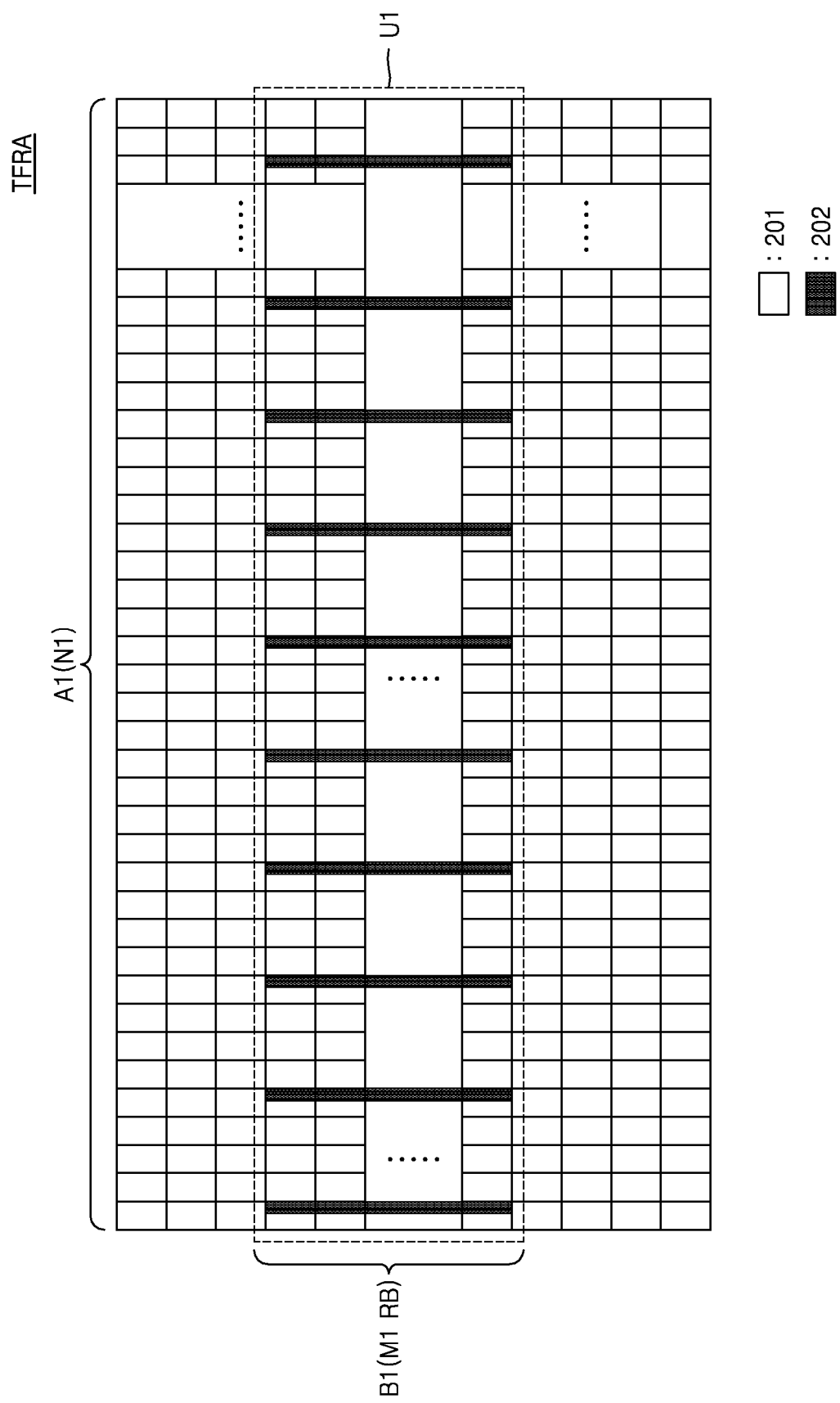

FIG. 15C

WIRELESS COMMUNICATION SYSTEMS AND METHODS OF OPERATING THE SAME

CROSS-REFERENCE TO RELATED APPLICATION

This application claims the benefit of Korean Patent Application No. 10-2016-0165167, filed on Dec. 6, 2016, in the Korean Intellectual Property Office, the disclosure of which is incorporated herein in its entirety by reference.

BACKGROUND

Example embodiments relate to wireless communication systems, and more particularly, to wireless communication systems that perform a resource-mapping operation and a channel-estimating operation, and methods of operating the wireless communication systems.

Various types of physical channels and pilot signals in a wireless communication system have their own roles according to their characteristics. For example, in a downlink, there are physical channels such as a physical broadcast channel (PBCH) that provides basic information such as the number of transmission ports of a base station, a system frequency band, and a system frame number; a physical downlink shared channel (PDSCH) that corresponds to a data channel, a physical downlink control channel (PDCCH) that is a control channel used in PDSCH transmission, a physical control format indicator channel (PCFICH) that provides an indication of a transmission format of the PDCCH, a physical hybrid Automatic Repeat reQuest (ARQ) indicator channel (PHICH) that transmits hybrid ARQ information, and an enhanced physical downlink control channel (EPDCCH) that functions as an additional control channel. Pilot signals used in detecting these physical channels may include at least one of cell-specific reference signals (CRSs), demodulation reference signals (DM-RSs), multicast-broadcast single-frequency network (MBFSN) reference signals, and position measurement reference signals. The pilot signals may be referred to as reference signals for channel estimation. A channel, through which a corresponding physical channel passes, is estimated so that a data symbol corresponding to each of the physical channels may be detected and decoded. Such channel estimation is performed by using the pilot signals, and the pilot signals are respectively arranged so that times when the physical channels are transmitted and time-frequency resource areas may be estimated. Also, as the number of pilot signals is increased, an estimating performance of a receiver channel may be further improved. However, as the number of pilot signals is increased, a data transmission rate is relatively reduced such that there is a limitation to increasing the number of the pilot signals.

SUMMARY

Example embodiments provide wireless communication systems that may perform channel estimation using virtual pilot signals and provide a resource mapping method for a physical channel that supports channel estimation to improve reliability of the channel estimation, and methods of operating the wireless communication systems.

According to example embodiments, there is provided a method of operating a wireless communication system at a base station, the method includes determining, using at least one processor, first resource mapping patterns of a first physical channel used to generate virtual pilot signals so as to improve downlink channel estimation, based on state information of a user equipment (UE), in every first period. The method further includes mapping, using the at least one processor, the first physical channel onto resource elements adjacent to resource elements onto which pilot signals are mapped, in a time-frequency resource area (TFRA) of a downlink signal based on the determined first resource mapping patterns. Furthermore, the method includes transmitting, using the at least one processor, the downlink signal to the UE.

According to example embodiments, there is provided a method of operating a wireless communication system performed by a communication device, the method includes receiving, using at least one processor, a downlink signal including a transmission area mapped onto resource elements adjacent to resource elements onto which pilot signals are mapped, in a direction of a frequency axis or a direction of a time axis, from a base station using a first physical channel. The method further includes generating, using the at least one processor, a reference channel value corresponding to the pilot signals by using the pilot signals. The method further includes detecting, using the at least one processor, the first physical channel using the reference channel value. The method further includes generating, using the at least one processor, a first virtual pilot signal using a result of the detecting. The method further includes estimating, using the at least one processor, a downlink channel in the transmission area by using the pilot signals and the first virtual pilot signal. Furthermore, the method includes recovering, using the at least one processor, data corresponding to the first physical channel using the downlink channel estimation.

According to example embodiments, there is provided a method performed by a communication device that includes receiving, using at least one processor, a first downlink signal containing a data symbol, wherein the first downlink signal includes at least one pilot signal and a first physical channel mapped to resource elements. The method further includes performing, using the at least one processor, channel estimation to obtain at least one first channel value of resource elements onto which the at least one pilot signal is mapped. The method further includes performing, using the at least one processor, channel estimation using the at least one first channel value to obtain a second channel value corresponding to the first physical channel. The method further includes acquiring, using the at least one processor, an estimated data symbol using the second channel value, wherein the estimated data symbol is related to the data symbol contained in the first downlink signal. The method further includes generating, using the at least one processor, at least one virtual pilot signal using the estimated data symbol. The method further includes performing, using the at least one processor, channel estimation using the at least one virtual pilot signal and the first downlink signal to obtain at least one third channel value corresponding to the first physical channel. Furthermore, the method includes recovering, using the at least one processor, data corresponding to the first physical channel using the at least one third channel value.

BRIEF DESCRIPTION OF THE DRAWINGS

Example embodiments will be more clearly understood from the following detailed description taken in conjunction with the accompanying drawings in which:

FIGS. 6A and 6B are time-frequency resource area (TFRA) schematics illustrating resource mapping patterns for a first physical channel and a second physical channel, respectively, according to example embodiments;

FIGS. 15A to 15C are resource block schematics that illustrate methods of generating virtual pilot signals by using a first physical channel and a second physical channel and performing channel estimation using the virtual pilot signals, according to example embodiments;

DETAILED DESCRIPTION

Hereinafter, example embodiments will be described in detail with reference to the attached drawings.

Figure 1:
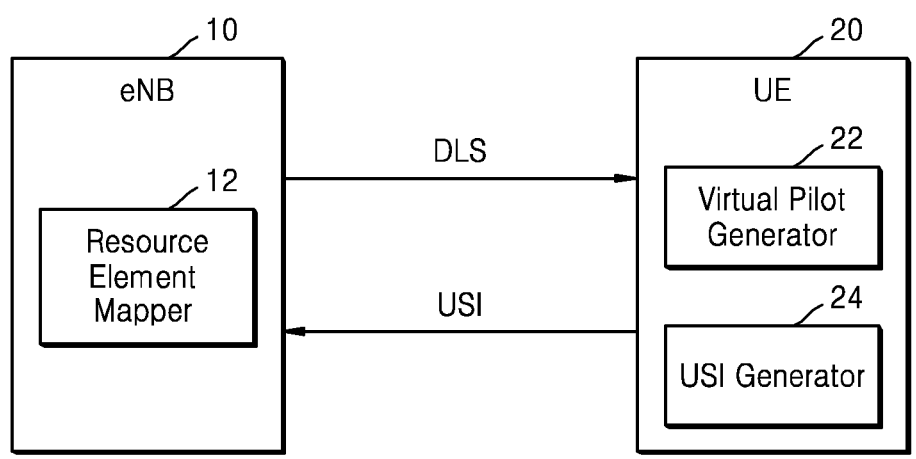
FIG. 1 is a conceptual view of an operation of a communication system, according to example embodiments.

FIG. 1 is a conceptual view of an operation of a communication system, according to example embodiments.

Referring to FIG. 1, a wireless communication system 1 may include a base station (eNB) 10 and a plurality of communication devices such as communication devices 20 within the cell coverage of the base station 10. The communication devices 20 may be referred to as transmitting terminals that transmit various types of information or receiving terminals that receive various types of information. Also, the communication devices 20 may be transceivers that perform both transmitting and receiving functions. In example embodiments, the communication devices 20 may be referred to as user equipment (UE).

The base station 10 may be a node B, an eNode B (eNB), a base station, an access point (AP), or the like and may be an arbitrary node that communicates with a UE. Also, each UE 20 may be mobile or fixed user equipment, such as a mobile station (MS) or an advanced mobile station (AMS).

A wireless communication network between the base station 10 and UE 20 may share available network resources to support communication between a plurality of users. The wireless communication network may be a universal mobile telecommunications system (UMTS) terrestrial radio access network (UTRAN) using 3rd generation (3G) mobile communication technology standardized by the 3rd generation partnership project (3GPP). The UMTS supports various air interface standards such as wideband-code division multiple access (W-CDMA), time division-code division multiple access (TD-CDMA), and time division-synchronous code division multiple access (TD-SCDMA).

The base station 10 may include at least one antenna port and may transmit a downlink signal (DLS) including data to the UE 20 via the at least one antenna port. The base station 10 may include the resource element mapper 12, and the resource element mapper 12 may map data symbols to be transmitted via the at least one antenna port of the base station 10 onto resource elements in a time-frequency resource area of a downlink. In example embodiments, the resource element mapper 12 may be implemented as a software module stored in a memory and executed by a processor to implement the functions described herein. In example embodiments, the resource element mapper 12 may be implemented using circuitry that is physically structured to execute the functions described herein. The resource element mapper 12 according to example embodiments may map physical channels onto resource elements adjacent to resource elements onto which pilot signals are mapped, based on various resource mapping patterns. The UE 20 uses the physical channels to generate virtual pilot signals. An operation of generating virtual pilot signals using the UE 20 may be comprehensively referred to as a processing operation, and is performed to ensure that estimated data symbols corresponding to physical channels correlate to data symbols transmitted via the antenna ports of the base station 10.

A pilot signal may include at least one of a cell-specific reference signal (CRS), a demodulation reference signal (DM-RS), a multicast-broadcast single-frequency network (MBFSN) reference signal, and a position measurement reference signal. A virtual pilot signal may be a signal used to estimate a downlink channel at the UE. According to example embodiments, physical channels used to generate the virtual pilot signals may be control channels detected according to priorities in the UE, such as a physical broadcast channel (PBCH), a physical control format indicator channel (PCFICH), a physical hybrid ARQ indicator channel (PHICH), a physical downlink control channel (PDCCH), and an enhanced physical downlink control channel (EPDCCH). However, these are just example embodiments, and detection priorities may be arbitrarily set in a physical downlink shared channel (PDSCH), and a virtual pilot signal may be generated using the PDSCH. Detailed descriptions thereof will be provided in association with FIG. 16.

That is, the resource element mapper 12 may map determined physical channels onto resource elements adjacent to the resource elements onto which pilot signals are mapped, thereby supporting the UE 20 to generate virtual pilot signals more easily.

The UE 20 may include a virtual pilot generator 22 and a user equipment state information (USI) generator 24. In example embodiments, each of the virtual pilot generator 22 and the USI generator 24 may be implemented as software modules stored in a memory and executed by a processor to implement the functions described herein. In example embodiments, each of the virtual pilot generator 22 and the USI generator 24 may be implemented using circuitry that is physically structured to execute the functions described herein. The virtual pilot generator 22 may generate a first channel value corresponding to a pilot signal in the time-frequency resource area of the DLS. The virtual pilot generator 22 may use the first channel value to determine a second channel value of a determined physical channel used in the DLS. The virtual pilot generator 22 may also generate a virtual pilot signal based on an estimated data symbol acquired using the second channel value. The UE 20 may estimate a downlink channel in a transmission area including the pilot signal and estimate the determined physical channel using the pilot signal and the virtual pilot signal. Detailed methods of generating the virtual pilot signal using the UE 20 and estimating the downlink channel using the generated virtual pilot signal will be described further below.

The USI generator 24 may generate user equipment state information (USI) and provide the USI to the base station 10. The USI may include at least one of movement speed information of the UE 20 and multi-path channel delay information of the UE 20.

The resource element mapper 12 may determine resource mapping patterns of physical channels in each unit time-frequency resource area corresponding to a detection unit transmission period of the physical channel, based on the USI. According to example embodiments, the resource element mapper 12 may select at least one of a pattern mapped in a direction of a frequency axis based on the USI and a pattern mapped in a direction of a time axis based on the USI and may determine the selected pattern as a resource mapping pattern. Thus, the resource element mapper 12 may map the physical channels onto resource elements adjacent to resource elements onto which pilot signals are mapped, in the time-frequency resource area of the downlink based on the determined resource mapping pattern.

In the wireless communication system 1 according to example embodiments, resource mapping patterns of physical channels used to generate virtual pilot signals are changed according to the state of a UE. The virtual pilot signals are generated, and a channel of the downlink is estimated using the virtual pilot signals so that reliability of channel estimation may be improved and data throughput may be enhanced.

Figure 2:
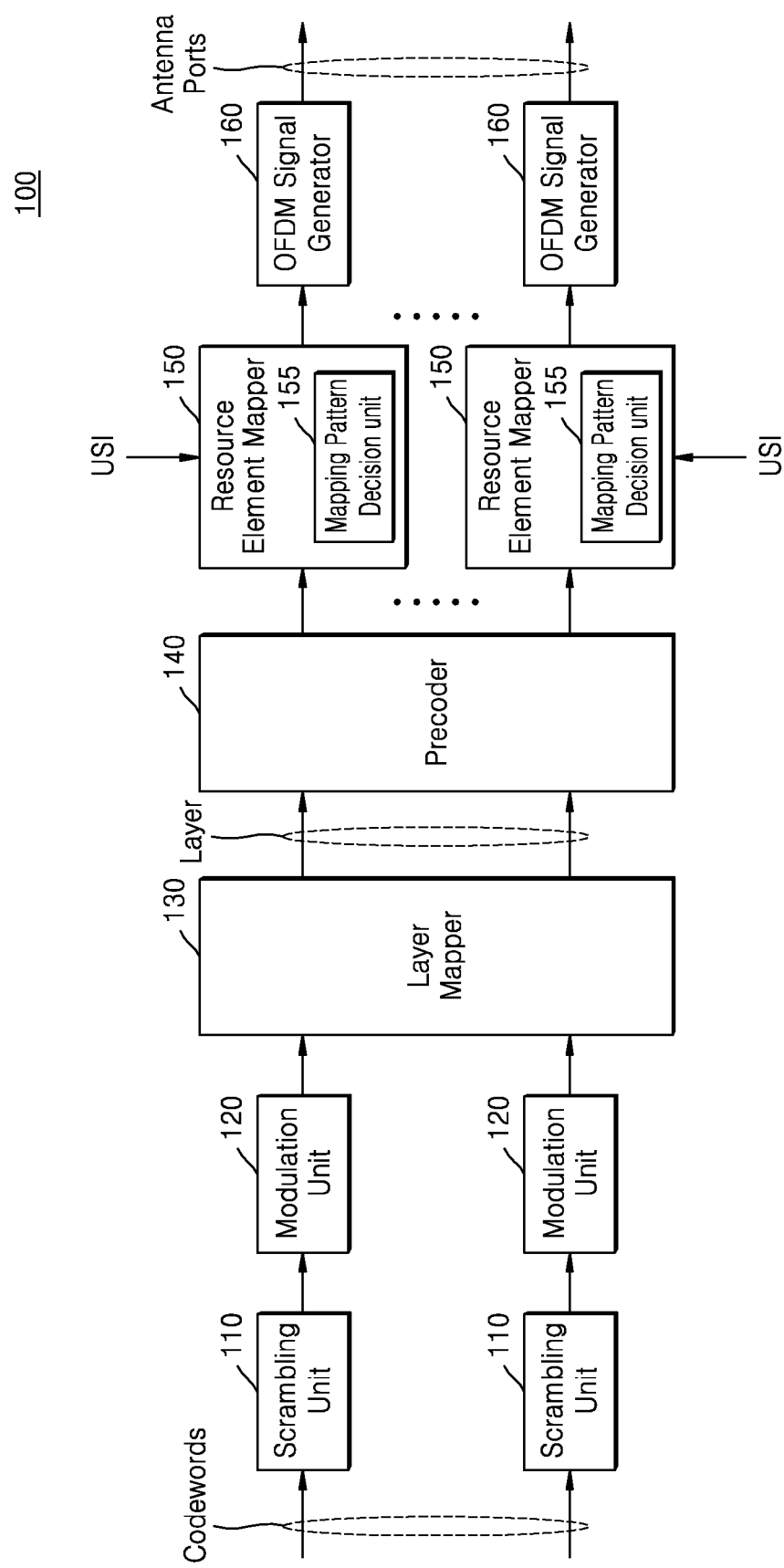
FIG. 2 is a block diagram of a transmitter of a base station, according to example embodiments.

FIG. 2 is a block diagram of a transmitter of a base station according to example embodiments.

Referring to FIG. 2, a base station (e.g., base station 10) may include a transmitter 100. The transmitter 100 may include a scrambling unit 110, a modulation unit 120, a layer mapper 130, a precoder 140, a resource element mapper 150, and an orthogonal frequency division multiplexing (OFDM) signal generator 160. In example embodiments, each of the scrambling unit 110, the modulation unit 120, the layer mapper 130, the precoder 140, the resource element mapper 150, and the OFDM signal generator 160 may be implemented as software modules stored in a memory and executed by a processor to implement the functions described herein. In example embodiments, each of the scrambling unit 110, the modulation unit 120, the layer mapper 130, the precoder 140, the resource element mapper 150, and the OFDM signal generator 160 may be implemented using circuitry that is physically structured to execute the functions described herein.

The scrambling unit 110 may receive determined codewords and perform scrambling on the codewords, which involves performing an arithmetic operation (e.g., an XOR operation) in which a scrambling sequence in units of bits is applied to the codewords. Neighboring base stations may have different scrambling sequences and may make the most of gains provided by channel coding due to a scrambling operation. The modulation unit 120 may perform a modulation operation of converting bits of the scrambled codewords into corresponding modulation symbols. According to example embodiments, the modulation unit 120 may perform the modulation operation using one of quadrature phase shift keying (QPSK), 16 quadrature amplitude modulation (QAM), and 64 QAM. The layer mapper 130 may map the modulation symbols generated by the modulation unit 120 onto layers. The number of layers may be changed from one to the total number of antenna ports of the base station. The precoder 140 may precode the modulation symbols mapped onto the layers using a precoding matrix.

The resource element mapper 150 may include a mapping pattern decision unit 155 and may map physical channels used to generate virtual pilot signals onto resource elements adjacent to resource elements onto which pilot signals are mapped, in the time-frequency resource area of the downlink based on the USI. Specifically, the resource element mapper 150 may map the precoded modulation symbols corresponding to the physical channels onto resource elements in a frequency resource of the downlink. In example embodiments, in a PBCH, the resource element mapper 150 may map the modulation symbols corresponding to system information in the form of a master information block (MIB) onto resource elements in the time-frequency resource area of the downlink. The MIB may include downlink bandwidth information, PHICH setting information, sub-frame numbers, and the like.

According to example embodiments, the resource element mapper 150 may perform a mapping operation differently according to the types of physical channels used to generate the virtual pilot signals. That is, the resource element mapper 150 may change a degree of adjacency between resource elements onto which physical channels are mapped, and resource elements onto which pilot signals are mapped, according to detection priorities of physical channels using the pilot signals at a UE. In example embodiments, the resource element mapper 150 may map a first physical channel and a second physical channel used to generate virtual pilot signals onto the time-frequency resource area. In this case, when the UE detects the first physical channel prior to the second physical channel, the resource element mapper 150 may map the first physical channel onto resource elements more adjacent to the resource elements onto which the pilot signals are mapped, than the second physical channel. Furthermore, the resource element mapper 150 may map the first physical channel first and then may map the second physical channel onto the remaining time-frequency resource area. According to example embodiments, the first physical channel may be a PBCH, and the second physical channel may include at least one of a PCFICH, a PHICH, a PDCCH, an EPDCCH, and a PDSCH. However, these are just example embodiments, and example embodiments are not limited thereto. A resource mapping operation may be performed based on detection priorities by classifying the detection priorities even within the same physical channel. Hereinafter, it is assumed that the first physical channel and the second physical channel are distinguished from each other by being classified based on the detection priorities at a UE.

The OFDM signal generator 160 may generate OFDM signals used to transmit the physical channels mapped onto the resource elements by the resource element mapper 150 as downlink signals to a UE and may transmit the generated OFDM signals to the UE via corresponding antenna ports. However, the block configuration of the transmitter 100 of the base station illustrated in FIG. 2 corresponds to example embodiments, and example embodiments are not limited thereto. The transmitter 100 of the base station of FIG. 2 may have various block configurations according to various communication protocols.

Figure 3A:
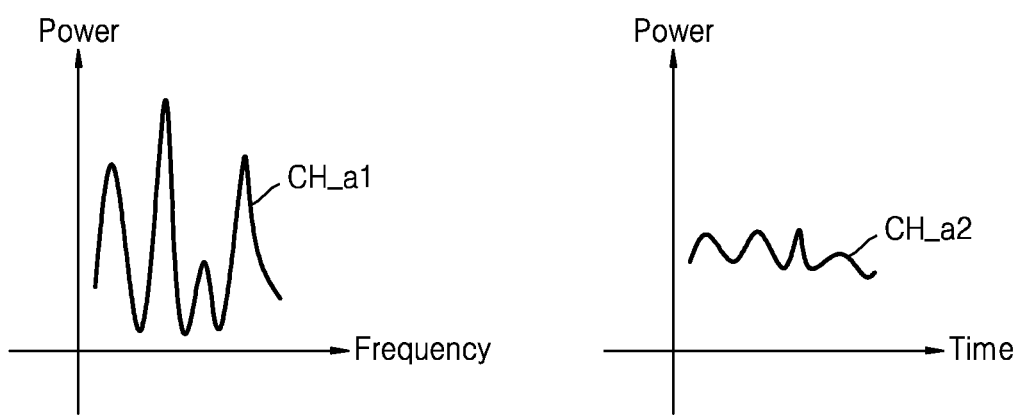
FIGS. 3A and 3B are graphs illustrating downlink channel states according to states of user equipment (UE), according to example embodiments.
Figure 3B:
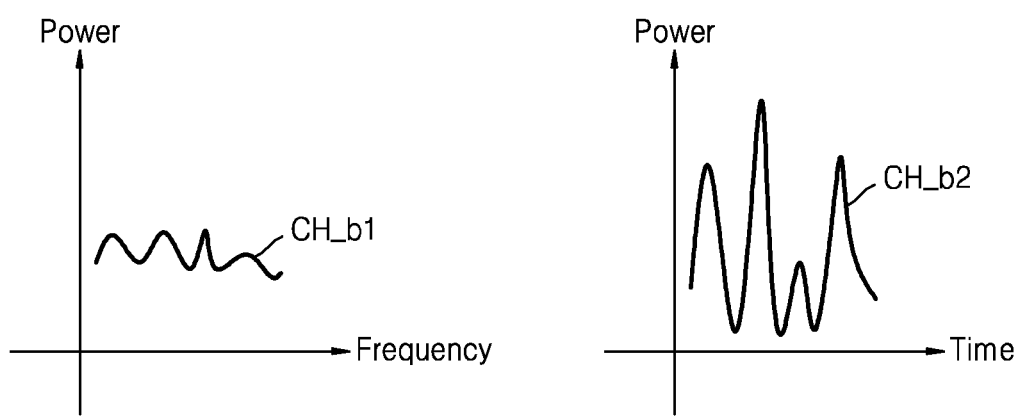

FIGS. 3A and 3B are graphs illustrating states of a downlink channel according to the states of a UE, according to example embodiments.

FIG. 3A is a graph showing a channel state of a downlink with respect to a UE when a degree of delay of downlink signals caused by multi-paths exceeds a channel delay threshold value and the movement speed of the UE is equal to a movement speed threshold value or less. When a degree of delay of the downlink signal caused by the multi-paths exceeds a channel delay threshold value, a channel CH_a1 formed based on a frequency axis may be unstable. In this case, when channel estimation of the downlink is performed based on the frequency axis using the pilot signals, reliability of channel estimation may be relatively low. However, when the movement speed of the UE is equal to a movement speed threshold value or less, a channel CH_a2 formed based on a time axis may be constant, and when channel estimation of the downlink is performed based on the time axis using pilot signals, reliability of channel estimation may relatively high.

FIG. 3B is a graph showing a channel state of a downlink with respect to a UE when a degree of delay of downlink signals caused by multi-paths is equal to a channel delay threshold value or less and the movement speed of the UE exceeds a movement speed threshold. That is, when the degree of delay of the downlink signals caused by multi-paths is equal to a channel delay threshold value or less, a channel CH_b1 formed based on a frequency axis may be stable. In this case, when channel estimation of the downlink is performed based on the frequency axis using the pilot signals, reliability of channel estimation may be relatively high. However, when the movement speed of the UE exceeds a movement speed threshold value, such as, in a situation in which a user of the UE performs communication with the base station using the UE when getting on a high-speed train, a channel CH_b2 formed based on a time axis may be unstable. In this case, when channel estimation of the downlink is performed based on the time axis using the pilot signals, reliability of channel estimation may be relatively low.

In this way, when a base station maps physical channels used to generate virtual pilot signals, resource mapping patterns are changed according to the state of a UE so that when the UE performs channel estimation based on a frequency axis or time axis, the reliability of the channel estimation may be improved.

Figure 4:
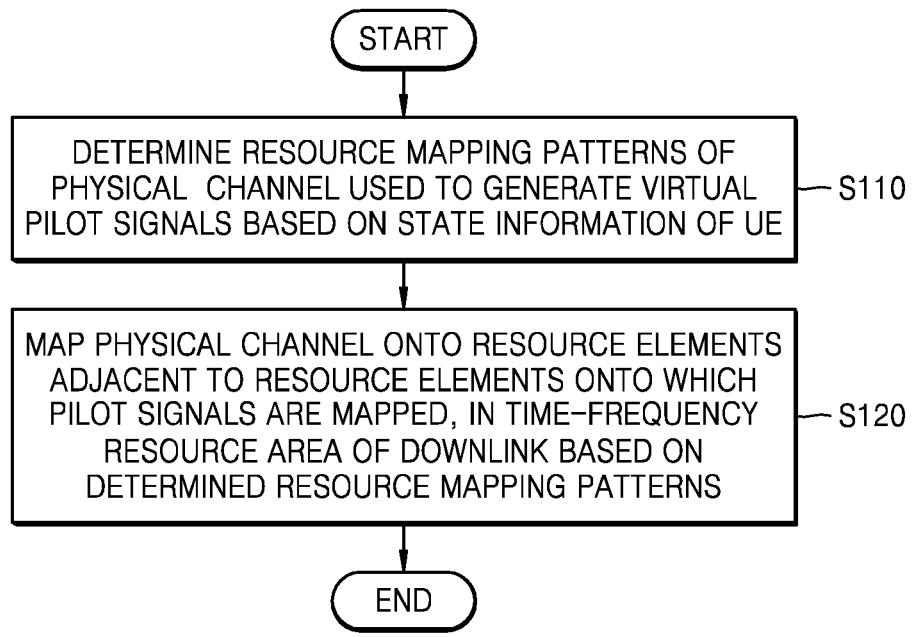
FIG. 4 is a flowchart illustrating methods of operating a wireless communication system based on an operation of a base station, according to example embodiments.

FIG. 4 is a flowchart illustrating methods of operating a wireless communication system based on an operation of a base station, according to example embodiments.

Referring to FIG. 4, the base station may determine resource mapping patterns of physical channels used to generate virtual pilot signals for channel estimation at a UE based on USI (S110). Subsequently, the base station may map the physical channels onto resource elements adjacent to resource elements onto which pilot signals are mapped, in a time-frequency resource area of a downlink based on the determined resource mapping patterns (S120).

Figure 5:
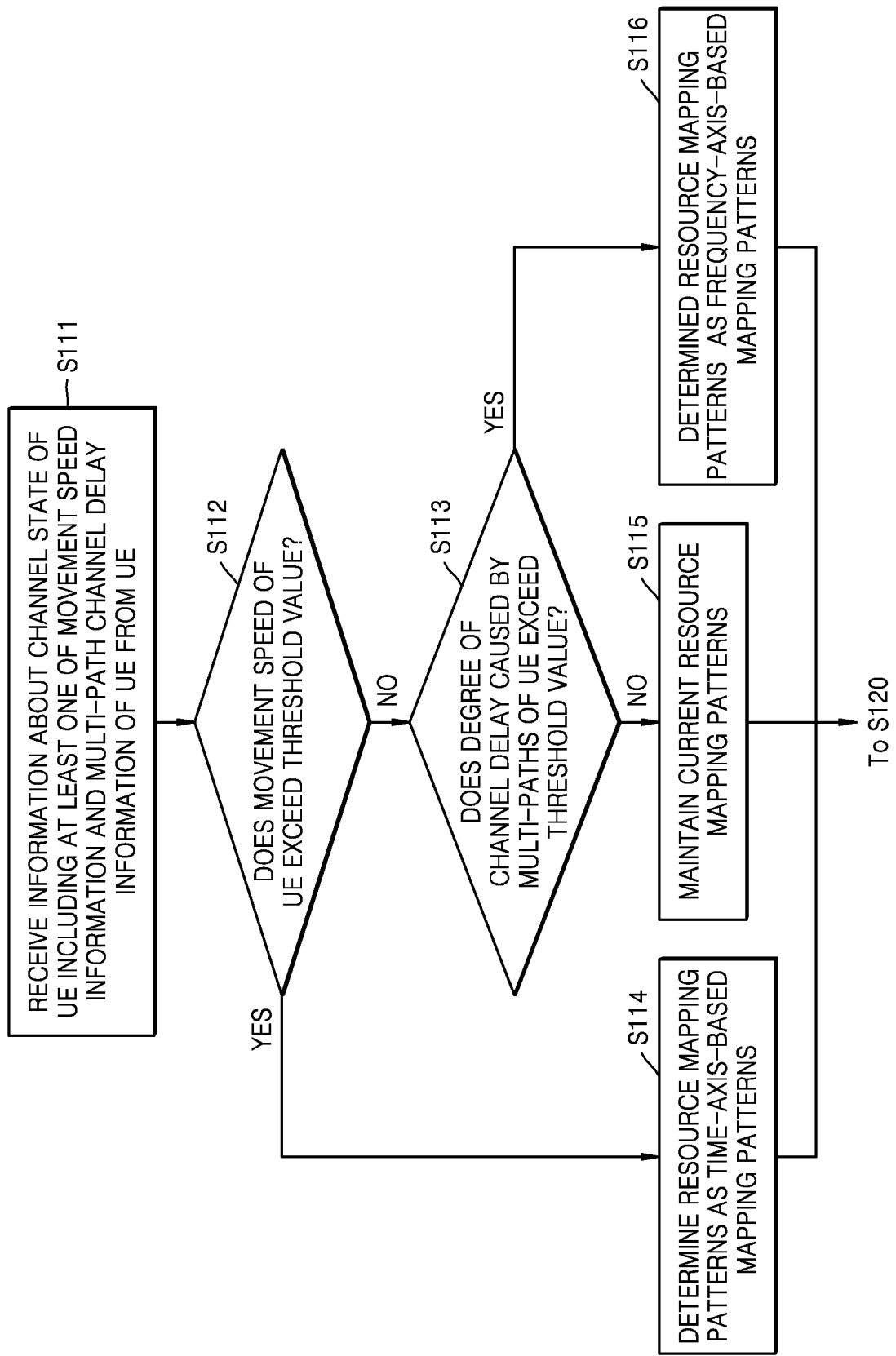
FIG. 5 is a flowchart of an operation of determining resource mapping patterns, according to example embodiments.

FIG. 5 is a flowchart of an operation of determining resource mapping patterns, according to example embodiments.

Referring to FIG. 5, a base station may receive information about a channel state of a UE including at least one of movement speed information and multi-path channel delay information of the UE from the UE (S111). The base station may determine whether the movement speed of the UE exceeds a movement speed threshold value (S112), and when the movement speed of the UE exceeds the movement speed threshold value (S112, Yes), resource mapping patterns of physical channels may be determined as time-axis-based mapping patterns (S114). When the movement speed of the UE is equal to the movement speed threshold value or less (S112, No), the base station may determine whether a degree of channel delay caused by multi-paths of the UE exceeds a channel delay threshold value (S113). The UE may obtain the degree of channel delay caused by multi-paths using a root mean square (RMS) delay spread based on power delay profile or maximum excess delay. When the degree of channel delay caused by multi-paths of the UE exceeds the channel delay threshold value (S113, Yes), the base station may determine the resource mapping patterns of the physical channels as frequency-axis-based mapping patterns (S116). When the degree of channel delay caused by multi-paths of the UE is equal to the channel delay threshold value or less (S113, No), the currently determined resource mapping patterns of the physical channels may be maintained (S115). Operation S120 may be performed based on the resource mapping patterns of the physical channels determined in this way. Furthermore, when both the degree of channel delay caused by multi-paths of the UE and the movement speed of the UE exceed the respective threshold values, the degrees by which the respective threshold values are exceeded are compared, and the resource mapping patterns of the physical channels may be determined based on the result of the comparison. Detailed descriptions of resource mapping thereof will be further provided below.

Figure 6B:
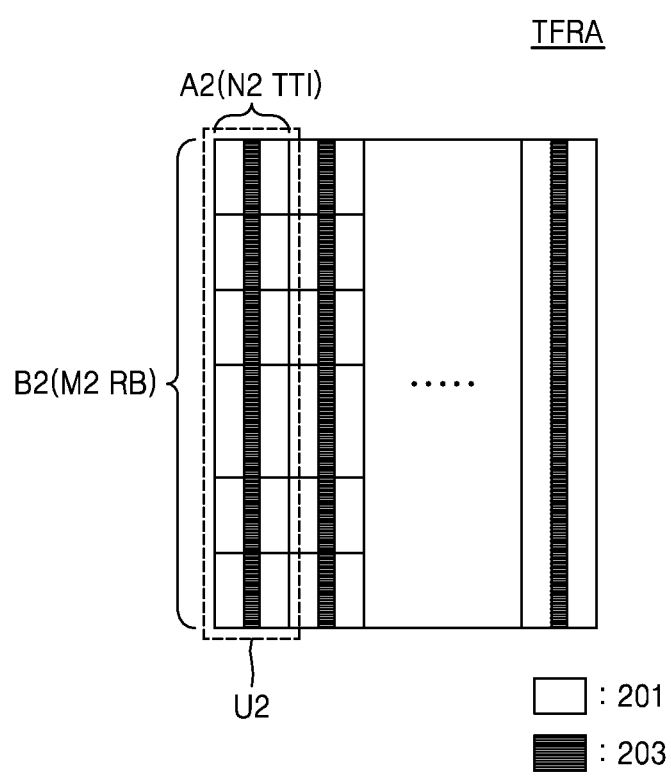

FIGS. 6A and 6B are time-frequency resource area (TFRA) schematics illustrating resource mapping patterns of a first physical channel and a second physical channel, according to example embodiments.

Referring to FIGS. 2 and 6A, the resource element mapper 150 may determine first resource mapping patterns of a first physical channel 202 in a TFRA of a downlink including a plurality of sub-frames 201 in units of one resource block (RB) based on USI in every first unit TFRA U1 corresponding to a detection unit transmission period A1 of the first physical channel 202. The resource element mapper 150 may map the first physical channel 202 onto resource elements adjacent to resource elements onto which pilot signals in the first unit TFRA U1 based on the determined first resource mapping patterns are mapped.

In detail, when the base station transmits the first physical channel 202 using a downlink signal in a first transmission period A1 having a length of N1 Transmission Time Intervals (TTIs), the resource element mapper 150 may determine the first resource mapping patterns of the first physical channel 202 in every first transmission period A1. Thus, the first physical channel 202 mapped onto the first unit TFRA U1 in the first transmission period A1 may have the same first resource mapping patterns. Also, the resource element mapper 150 may limit a frequency bandwidth B1 onto which the first physical channel 202 may be mapped, to M1 RBs, thereby mapping the first physical channel 202 onto the TFRA of the downlink corresponding to the limited frequency bandwidth B1.

Referring to FIGS. 2 and 6B, when a base station transmits the first physical channel 202 in a second transmission period A2 having a length of N2 TTIs using a downlink signal. The resource element mapper 150 may determine second resource mapping patterns of a second physical channel 203 in every second transmission period A2. The second physical channel 203 mapped onto a second unit TFRA U2 in the second transmission period A2 may have the same second resource mapping patterns. The resource element mapper 150 may map the second physical channel 203 onto the second unit TFRA U2 in the second transmission period A2 based on the determined second resource mapping patterns. According to example embodiments, the second transmission period A2 of the second physical channel 203 may be shorter than, or otherwise different from, the first transmission period A1 of the first physical channel 202.

Also, the resource element mapper 150 may limit a frequency bandwidth B2 onto which the second physical channel 203 may be mapped, to M2 RBs, thereby mapping the second physical channel 203 onto the TFRA of the downlink corresponding to the limited frequency bandwidth B2. The resource element mapper 150 may map the second physical channel 203 onto the TFRA corresponding to the frequency bandwidth B2 by setting the entire frequency bandwidth to M2 RBs. According to example embodiments, the frequency bandwidth B2 onto which the second physical channel 203 may be mapped, may be larger than, or otherwise different from, the frequency bandwidth B1 onto which the first physical channel 202 may be mapped. However, these are just example embodiments, and example embodiments are not limited thereto. The resource element mapper 150 may not limit the frequency bandwidth B2 onto which the second physical channel 203 may be mapped, but may map the second physical channel 203 onto the entire frequency bandwidth of the downlink.

Hereinafter, methods of mapping physical channels will be described based on a pilot transmission method assuming a normal cyclic prefix (CP). However, these are just example embodiments, and example embodiments are not limited thereto. In example embodiments the pilot transmission method assumes an extended CP.

Figure 7A:
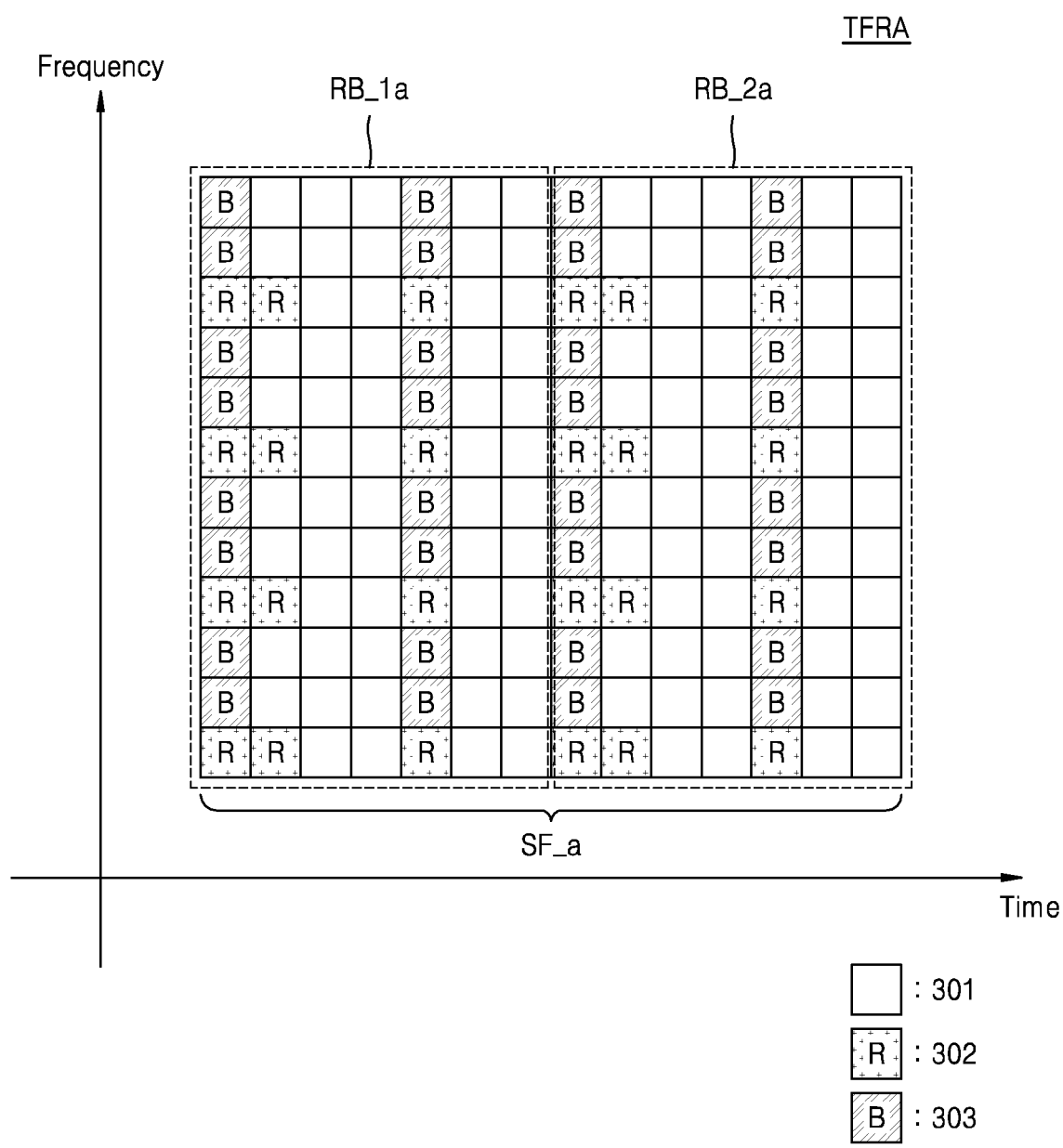
FIGS. 7A and 7B are TFRA sub-frame schematics that illustrate methods of mapping a first physical channel onto a time-frequency resource area, according to example embodiments.
Figure 7B:
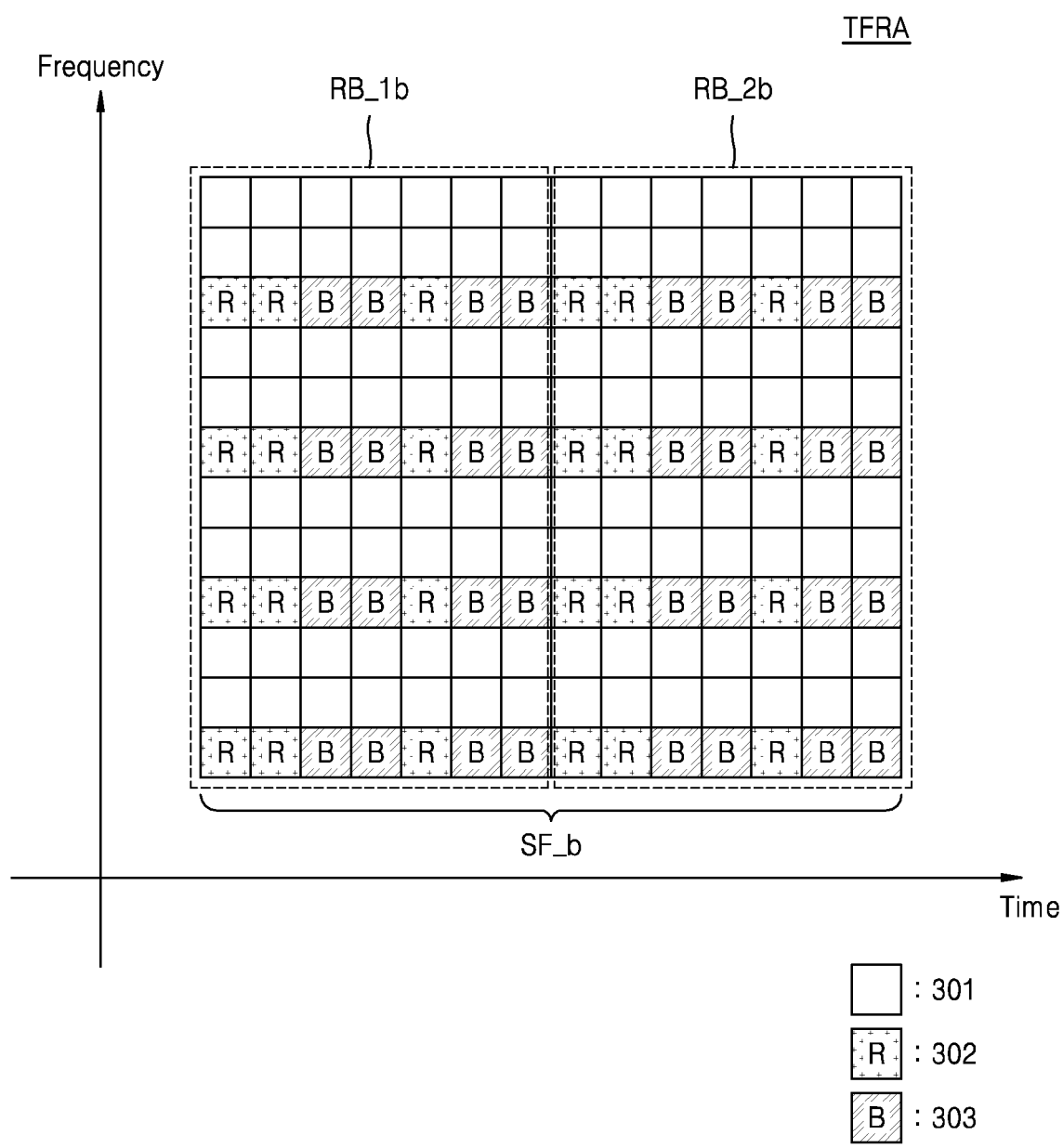

FIGS. 7A and 7B are TFRA sub-frame schematics that illustrate methods of mapping a first physical channel onto a TFRA, according to example embodiments.

Referring to FIG. 7A, a base station may map a first physical channel 303 onto a first resource block RB_1a and a second resource block RB_2a that constitute a sub-frame SF_a of the TFRA of a downlink. Also, in this way, the TFRA onto which the first physical channel 303 is mapped and transmitted to a UE as a downlink signal, may be referred to as a transmission area. According to example embodiments, a pilot signal may be a CRS, and the base station may map the first physical channel 303 onto resource elements adjacent to resource elements onto which pilot signals 302 in the first resource block RB_1a are mapped, in a direction of a frequency axis. That is, the base station may arrange the resource elements mapped onto the first physical channel 303 more densely on the frequency axis than a time axis based on the resource elements onto which the pilot signals 302 in the first resource block RB_1a are mapped. The base station may map other physical channels to the remaining resource elements 301 onto which the pilot signals and the first physical channel 303 are mapped, and the base station may also perform a resource mapping operation on the second resource block RB_2a in this way. The methods of mapping the first physical channel illustrated in FIG. 7A are just example embodiments, and example embodiments are not limited thereto. All types of mapping methods by which resource elements mapped onto a first physical channel used to generate virtual pilot signals are arranged more densely on a frequency axis may be applied in example embodiments.

Referring to FIG. 7B, in comparison with FIG. 7A, the base station may map the first physical channel 303 onto resource elements adjacent to resource elements onto which the pilot signals 302 in the first resource block RB_1b are mapped, based on a direction of a time axis. That is, the base station may arrange the resource elements mapped onto the first physical channel 303 more densely on the time axis than the frequency axis based on the resource elements onto which the pilot signals 302 in the first resource block RB_1b are mapped. The base station may map other physical channels onto the resource elements 301 remaining after the pilot signals 302 and the first physical channel 303 is mapped, and the base station may also perform a resource mapping operation on the second resource block RB_2b in this way. The methods of mapping the first physical channel illustrated in FIG. 7B are just example embodiments, and example embodiments are not limited thereto. All types of mapping methods by which resource elements mapped onto the first physical channel 303 used to generate virtual pilot signals are arranged more densely on the time axis, may be applied in example embodiments.

Figure 8A:
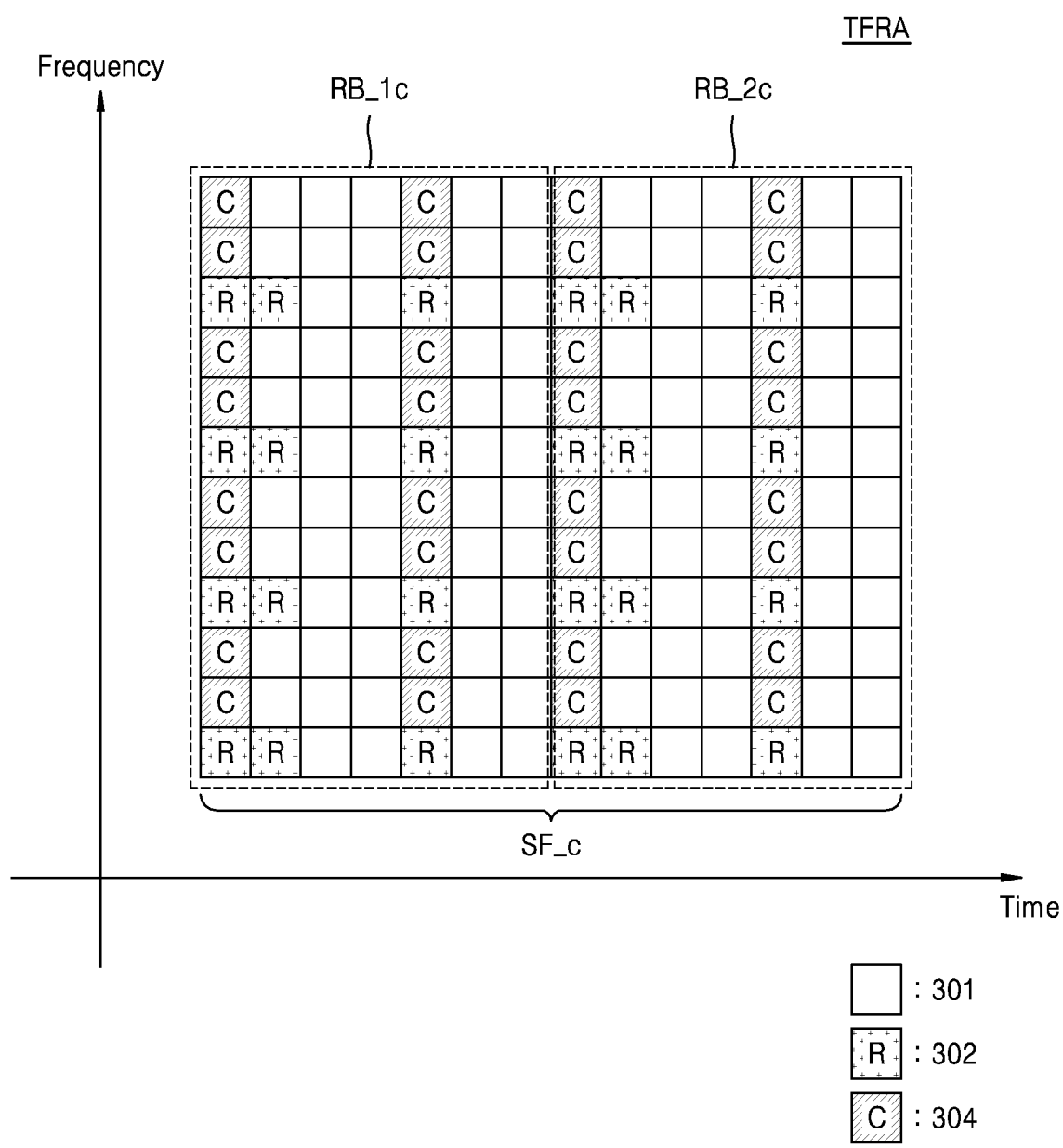
FIGS. 8A and 8B are TFRA sub-frame schematics that illustrate methods of mapping a second physical channel onto a time-frequency resource area, according to example embodiments.
Figure 8B:
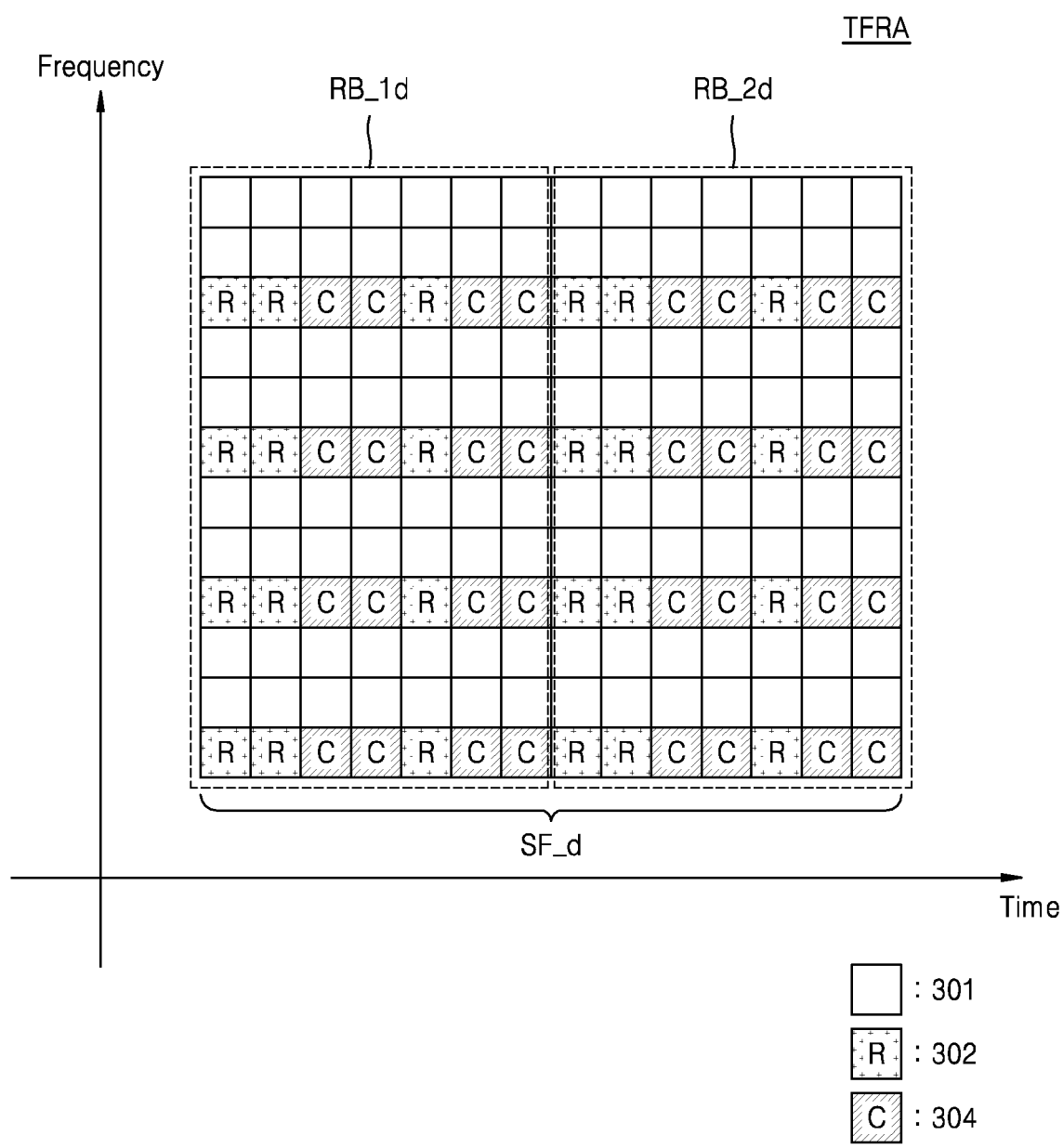

FIGS. 8A and 8B are TFRA sub-frame schematics that illustrate methods of mapping a second physical channel onto a TFRA, according to example embodiments.

Referring to FIG. 8A, a base station may map a second physical channel 304 onto a first resource block RB_1c and a second resource block RB_2c that constitute a sub-frame SF_c of a TFRA of a downlink. According to example embodiments, a pilot signal may be a CRS, and the base station may map a second physical channel 304 onto resource elements adjacent to resource elements onto which the pilot signals 302 in the first resource block RB_1c are mapped, in a direction of a frequency axis. The base station may also map the second physical channel 304 onto the second resource block RB_2c in this way.

Referring to FIG. 8B, a base station may map a second physical channel 304 onto resource elements adjacent to the resource elements onto which pilot signals 302 in a first resource block RB_1d are mapped, in the direction of a time axis. The base station may also map the second physical channel 304 onto a second resource block RB_2c in this way.

FIGS. 9A to 9D are TFRA sub-frame schematics that illustrate methods of mapping a first physical channel and a second physical channel onto a TFRA, according to example embodiments.

Figure 9A:
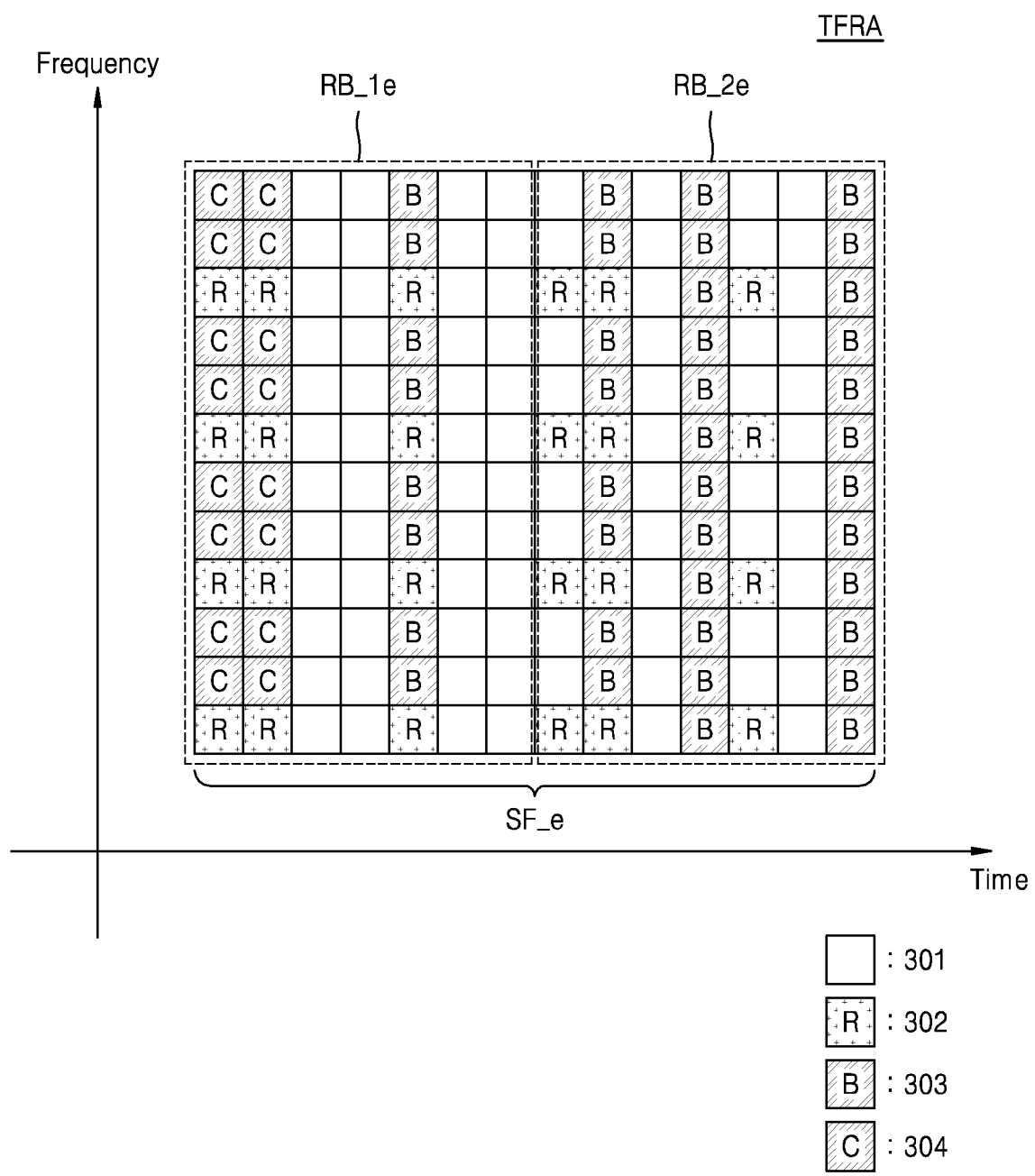
FIGS. 9A to 9D are TFRA sub-frame schematics that illustrate methods of mapping a first physical channel and a second physical channel onto a time-frequency resource area, according to example embodiments.

Referring to FIG. 9A, a base station may map a first physical channel 303 and a second physical channel 304 onto a first resource block RB_1e of a sub-frame SF_e of a TFRA of a downlink and may map the first physical channel 303 onto a second resource block RB_2e of sub-frame SF_e. The base station may map the second physical channel 304 and the first physical channel 303 onto resource elements adjacent to resource elements onto which pilot signals in the first resource block RB_1e are mapped, in a direction of a frequency axis. Also, the base station may map the first physical channel 303 onto resource elements adjacent to the resource elements onto which the pilot signals 302 in the second resource block RB_2e are mapped, in the direction of the frequency axis. In example embodiments, the second resource block RB_2e follows the first resource block RB_1e on a time axis.

Figure 9B:
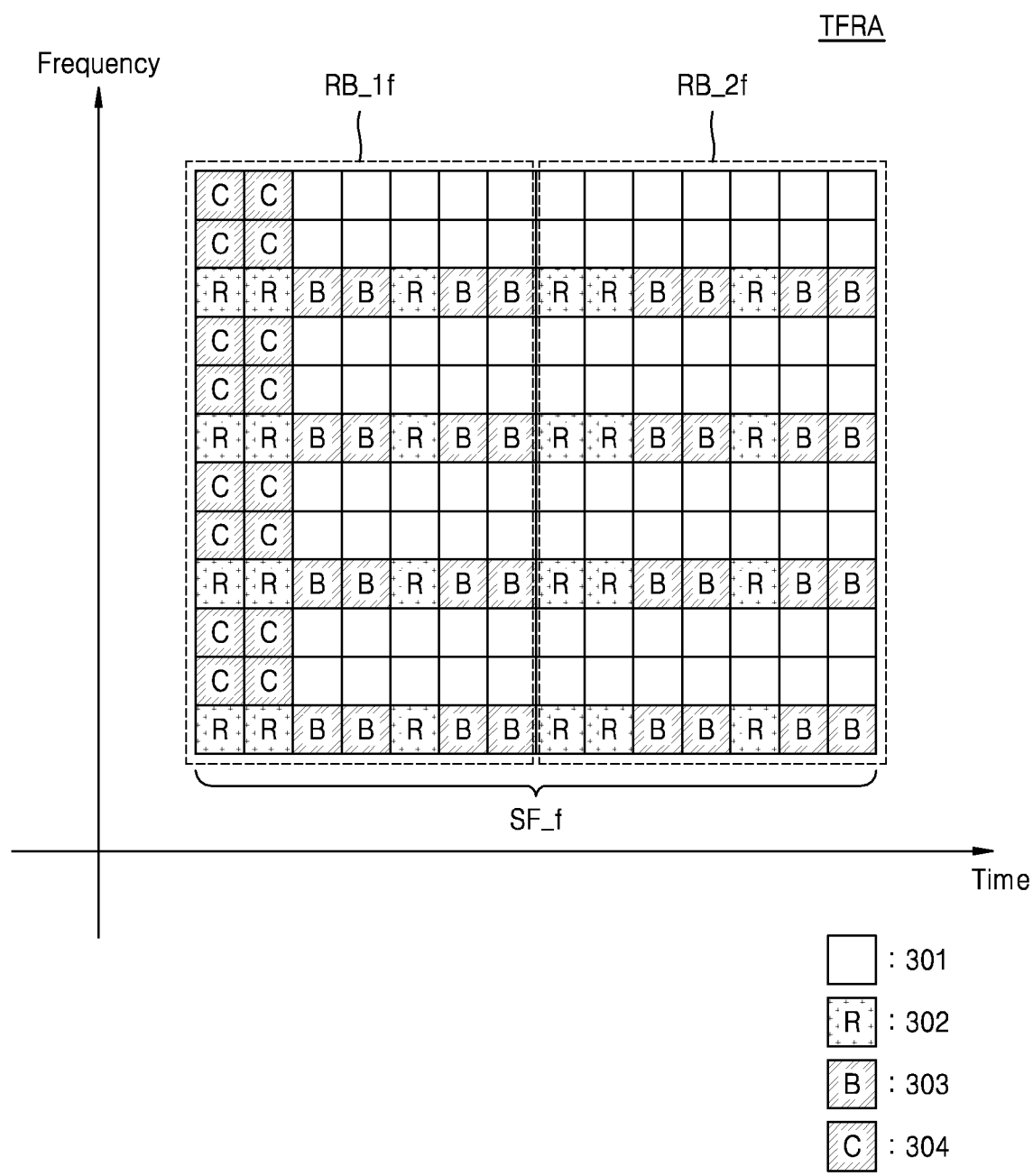

Referring to FIG. 9B, a base station may map a first physical channel 303 and a second physical channel 304 onto a first resource block RB_1f of a sub-frame SF_f of a TFRA of a downlink and may map the first physical channel 303 onto a second resource block RB_2f of sub-frame SF_f. The base station may map the first physical channel 303 onto resource elements adjacent to the resource elements onto which pilot signals 302 in the first resource block RB_1f are mapped, in the direction of a time axis. The second physical channel 304 mapped onto the first resource block RB_1f may maintain the same mapping patterns as those of FIG. 9A. Also, the base station may map the first physical channel 303 onto resource elements adjacent to resource elements onto which the pilot signals 302 in the second resource block RB_2f are mapped, in the direction of the time axis. In example embodiments, the second resource block RB_2f follows the first resource block RB_1f on the time axis.

Figure 9C:
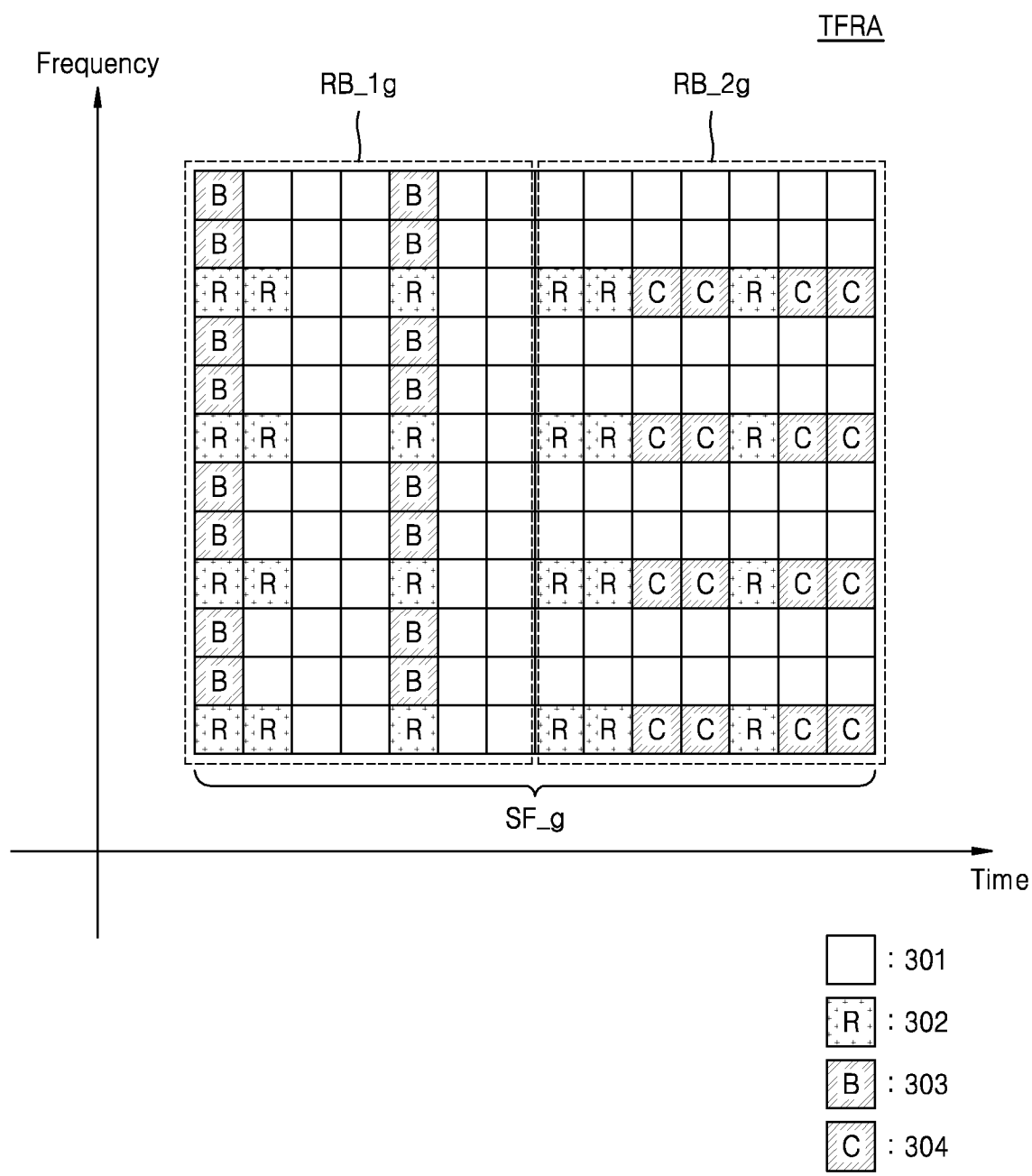

Referring to FIG. 9C, a base station may map a first physical channel 303 onto a first resource block RB_1g of a sub-frame SF_g of a TFRA of a downlink and may map a second physical channel 304 onto a second resource block RB_2g of sub-frame SF_g. The base station may map the first physical channel 303 onto resource elements adjacent to the resource elements onto which pilot signals 302 in the first resource block RB_1g are mapped, in the direction of a frequency axis. Also, the base station may map the second physical channel 304 onto resource elements adjacent to resource elements onto which the pilot signals 302 in the second resource block RB_2g are mapped, in the direction of a time axis. In example embodiments, the second resource block RB_2g follows the first resource block RB_1g on the time axis.

Figure 9D:
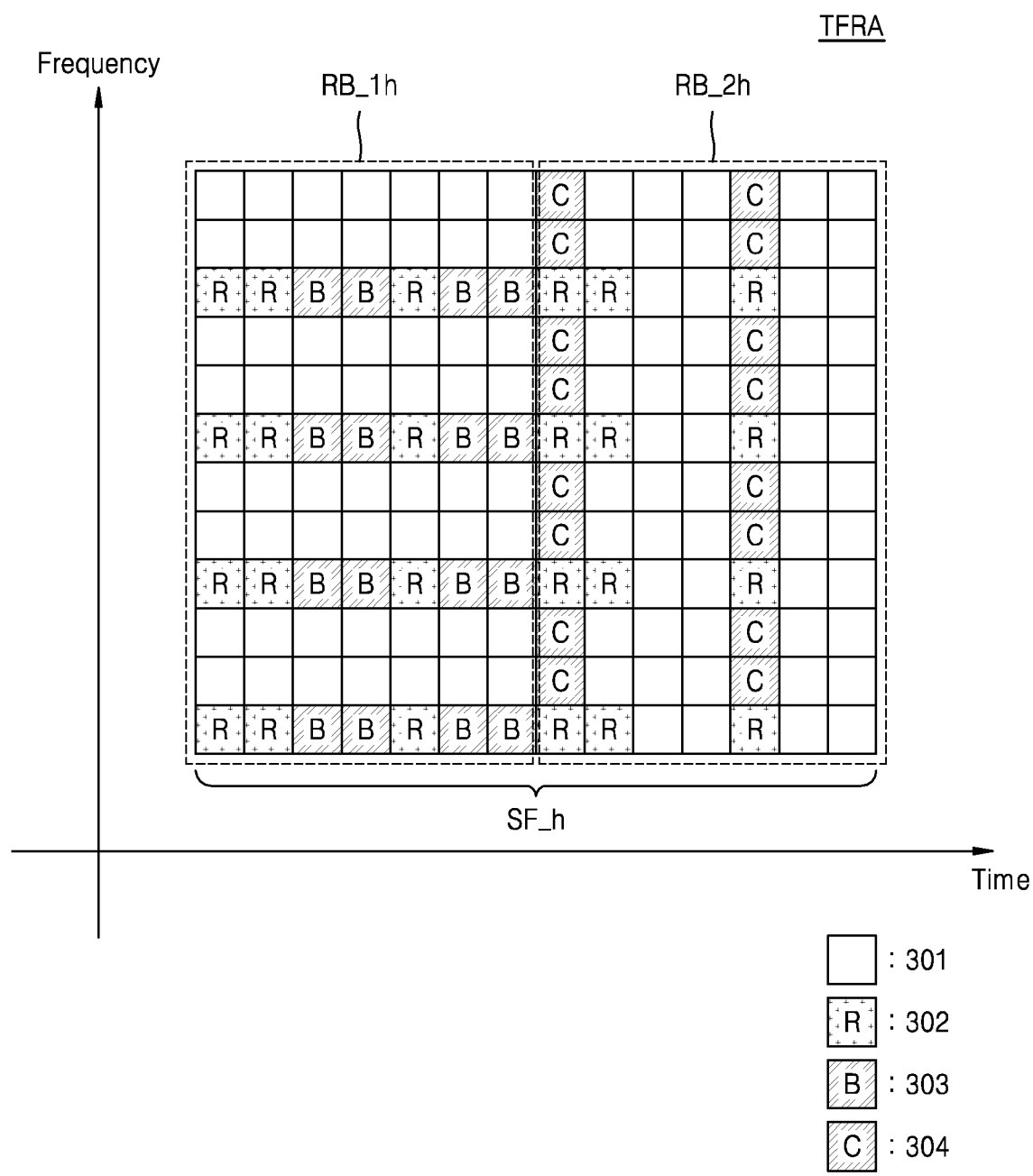

Referring to FIG. 9D, a base station may map a first physical channel 303 onto a first resource block RB_1h of a sub-frame SF_h of a TFRA of a downlink and may map a second physical channel 304 onto a second resource block RB_2h of sub-frame SF_h. The base station may map the first physical channel 303 onto resource elements adjacent to the resource elements onto which pilot signals 302 in the first resource block RB_1h are mapped, in the direction of a time axis. Also, the base station may map the second physical channel 304 onto resource elements adjacent to resource elements onto which the pilot signals 302 in the second resource block RB_2h are mapped, in the direction of a frequency axis. In example embodiments, the second resource block RB_2h follows the first resource block RB_1h on the time axis.

FIGS. 10A to 10E are TFRA sub-frame schematics that illustrate methods of mapping a second physical channel onto a TFRA based on USI from a UE, according to example embodiments.

Figure 10A:
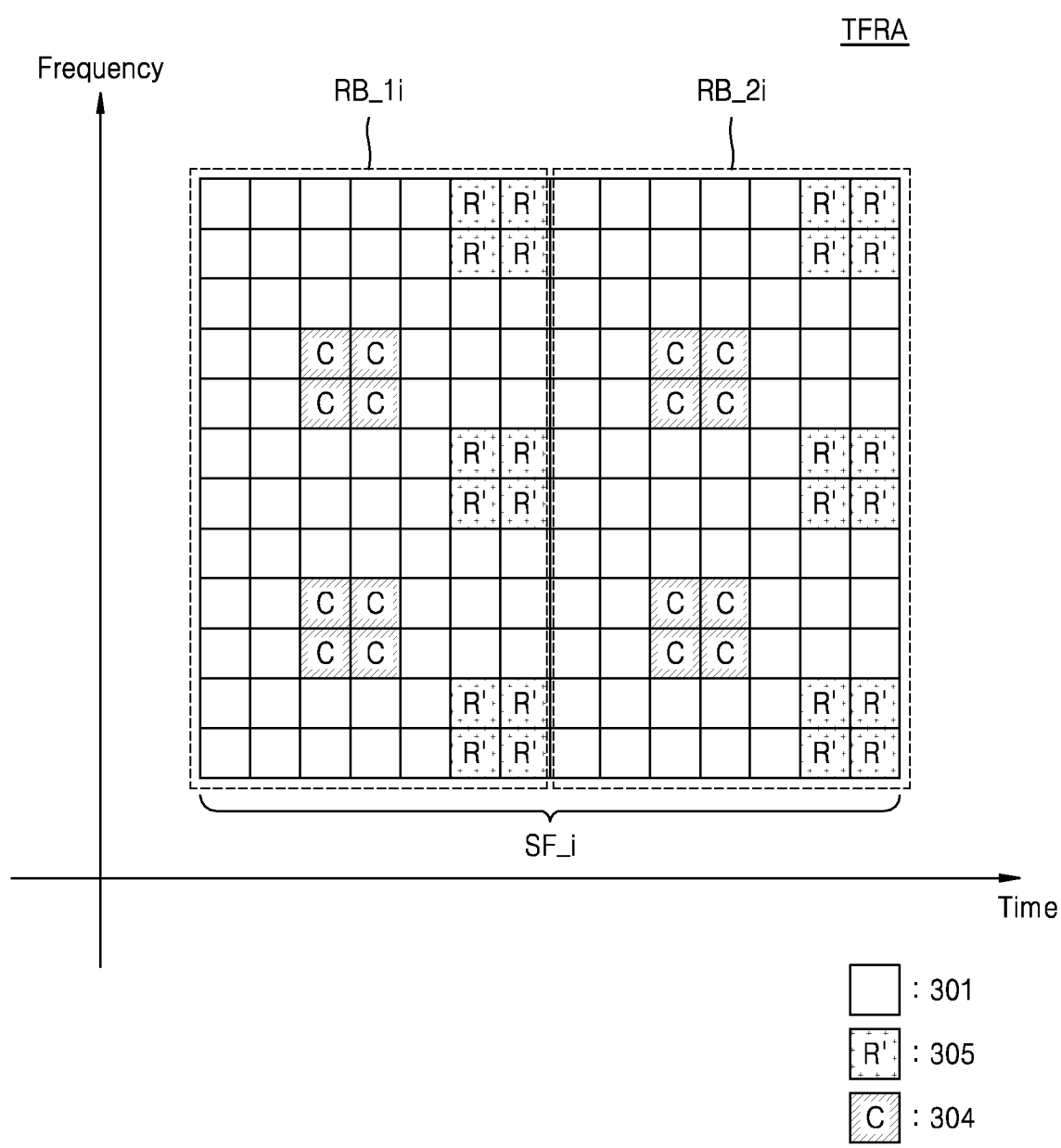
FIGS. 10A to 10E are TFRA sub-frame schematics that illustrate methods of mapping a second physical channel onto a time-frequency resource area based on user equipment state information (USI) from a UE, according to example embodiments.

Referring to FIG. 10A, a base station may map a second physical channel 304 onto a first resource block RB_1i and a second resource block RB_2i that constitute a sub-frame SF_i of a TFRA of a downlink. According to example embodiments, pilot signals 305 may be used only in channel estimation of a determined UE that receives a downlink signal of a determined frequency bandwidth, and furthermore, the pilot signals 305 may be DM-RSs. Also, when the pilot signals 305 are DM-RSs, the second physical channel 304 may be an EPDCCH. However, these are just example embodiments. Thus, example embodiments are not limited thereto, and the mapping methods illustrated in FIGS. 10A through 10C may be applied to various types of pilot signals and physical channels.

According to example embodiments, the base station may map the second physical channel 304 onto resource elements adjacent to resource elements onto which the pilot signals 305 in the first resource block RB_1i are mapped, based on a direction of a frequency axis and a direction of a time axis. That is, the base station may arrange the resource elements mapped onto the second physical channel 304 based on the resource elements onto which the pilot signals 305 in the first resource block RB_1i are mapped, uniformly on the time axis and the frequency axis. The base station may map other physical channels onto the remaining resource elements 301 onto which the pilot signals 305 and the second physical channel 304 are mapped, and the base station may also perform a resource mapping operation on the second resource block RB_2i in this way. The mapping methods of the second physical channel illustrated in FIG. 10A are just example embodiments, and example embodiments are not limited thereto. All types of mapping methods by which resource elements mapped onto a second physical channel are arranged uniformly on a frequency axis and a time axis may be applied in example embodiments.

Figure 10B:
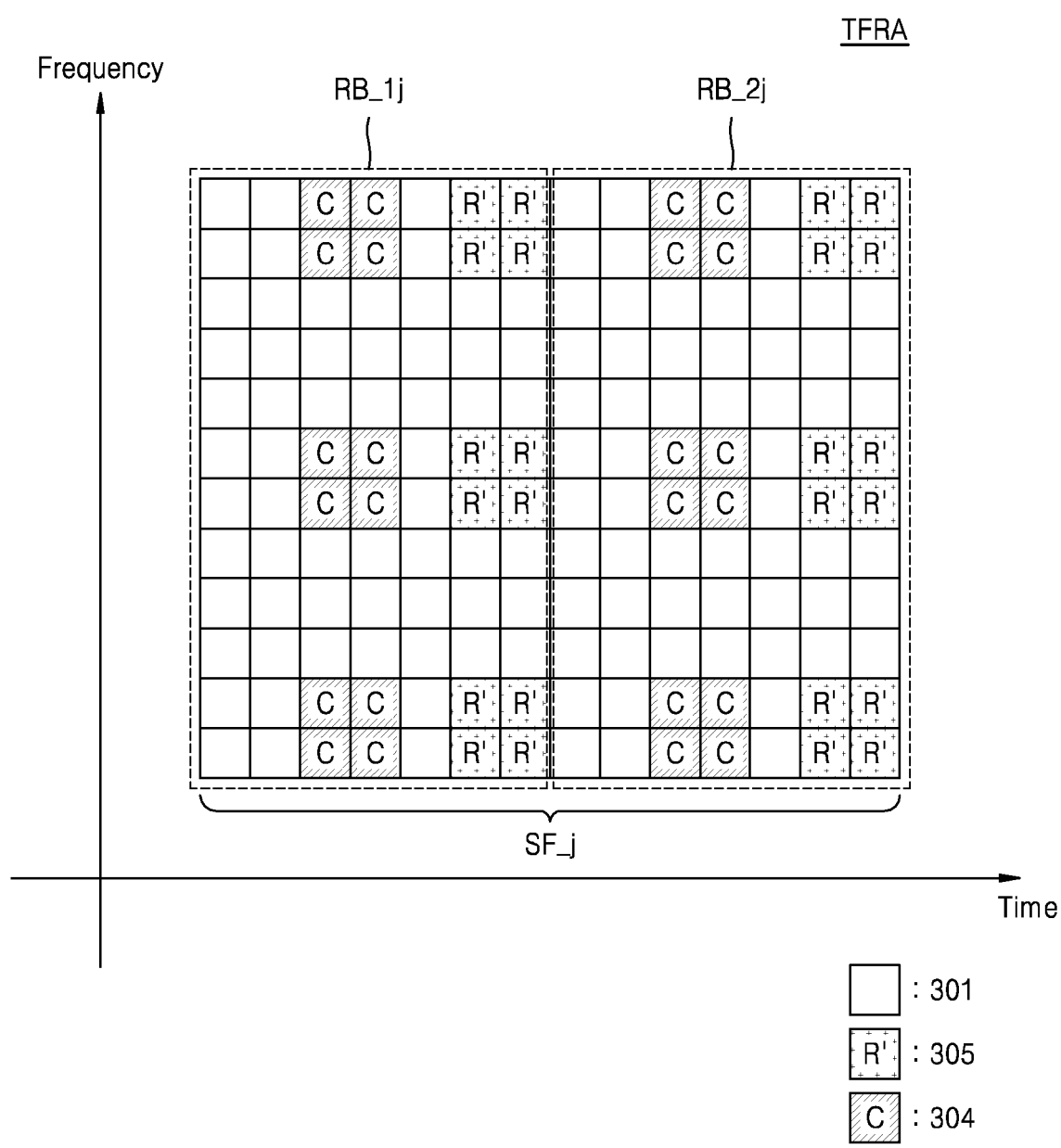

Referring to FIG. 10B, the base station may map the second physical channel 304 onto the first and second resource blocks RB_1j and RB_2j, respectively, by changing resource mapping patterns of the second physical channel 304 based on USI. According to example embodiments, when the base station refers to the USI and movement speed of a UE exceeds a movement speed threshold value, in comparison with FIG. 10A, the base station may map the second physical channel 304 onto resource elements more adjacent to the resource elements onto which the pilot signals 305 in the first resource block RB_1j are mapped, with regard to the direction of the time axis. That is, the base station may arrange the resource elements mapped onto the second physical channel 304 more densely on the time axis than the frequency axis based on the resource elements onto which the pilot signals 305 in the first resource block RB_1j are mapped. The base station may also map the second physical channel 304 onto the second resource block RB_2j in this way.

Figure 10C:
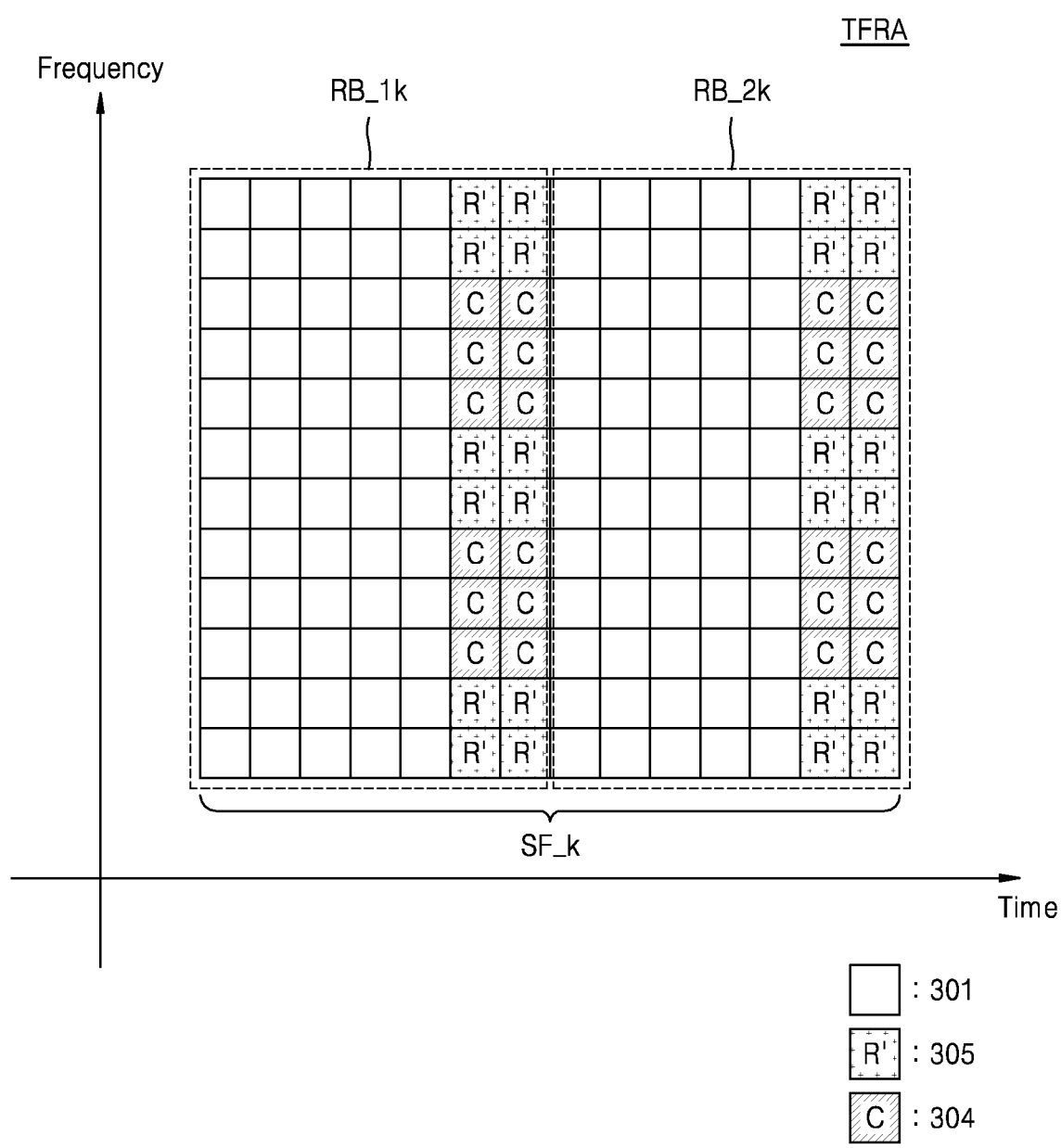

Referring to FIG. 10C, according to example embodiments, when the base station refers to the USI and a degree of delay of a channel caused by multi-paths of a UE exceeds a channel delay threshold value, in comparison with FIG. 10A, the base station may map the second physical channel 304 onto resource elements more adjacent to the resource elements onto which the pilot signals 305 in the first resource block RB_1k are mapped, with regard to a direction of the frequency axis. That is, the base station may arrange the resource elements mapped onto the second physical channel 304 more densely on the frequency axis than the time axis based on the resource elements onto which the pilot signals 305 in the first resource block RB_1k are mapped. The base station may also map the second physical channel 304 onto the second resource block RB_2k in this way.

Figure 10D:
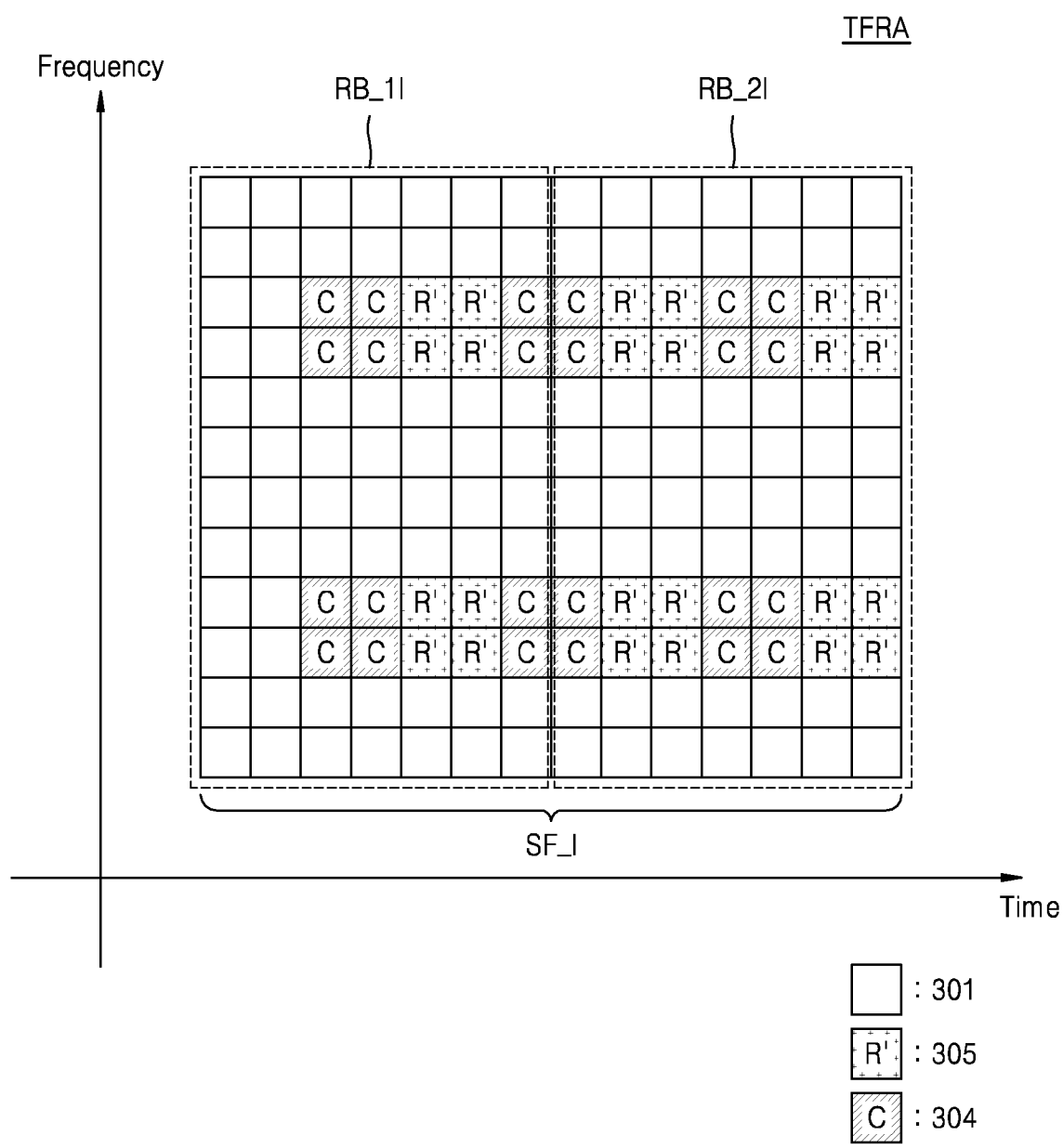

Referring to FIG. 10D, example embodiments provide for describing a resource mapping method of the second physical channel 304 on the assumption that the pilot signals 305 are mapped onto other resource mapping patterns according to a different communication protocol from that of FIG. 10B. According to example embodiments, when the base station refers to USI and a movement speed of the UE exceeds the movement speed threshold value, the base station may map the second physical channel 304 onto resource elements adjacent to the resource elements onto which the pilot signals 305 in the first resource block RB_1l are mapped, based on the direction of the time axis. That is, in comparison with FIG. 10B, the base station may arrange the resource elements mapped onto the second physical channel 304 more densely on the time axis. The base station may also map the second physical channel 304 onto the second resource block RB_2l in this way.

Figure 10E:
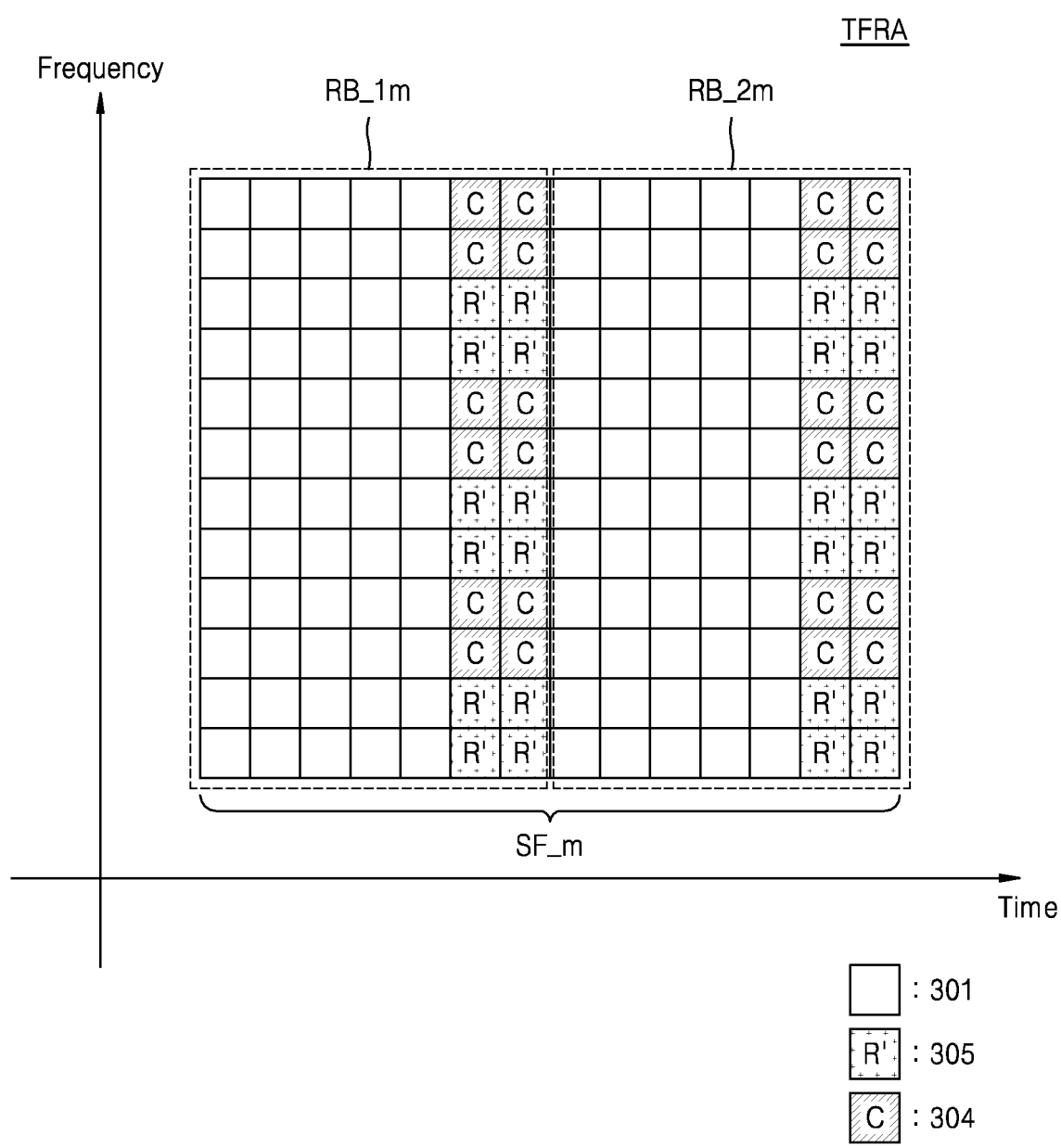

Referring to FIG. 10E, example embodiments provide for describing a resource mapping method of the second physical channel 304 on the assumption that the pilot signals 305 are mapped onto other resource mapping patterns according to a different communication protocol from that of FIG. 10C. According to example embodiments, when the base station refers to USI and a degree of delay of a channel caused by multi-paths of the UE exceeds the channel delay threshold value, the base station may map the second physical channel 304 onto the resource elements adjacent to the resource elements onto which the pilot signals 305 in the first resource block R6_1m are mapped, based on the direction of the frequency axis. The base station may also map the second physical channel 304 onto the second resource block RB_2m in this way. However, the resource mapping methods of the physical channel illustrated in FIGS. 10A to 10E are just example embodiments. Thus, example embodiments are not limited thereto, and there may be various modified example embodiments according to communication protocols.

A resource mapping operation on a physical channel may be performed based on USI according to example embodiments so that, when the UE estimates a downlink channel, reliability of channel estimation may be improved.

Figure 11:
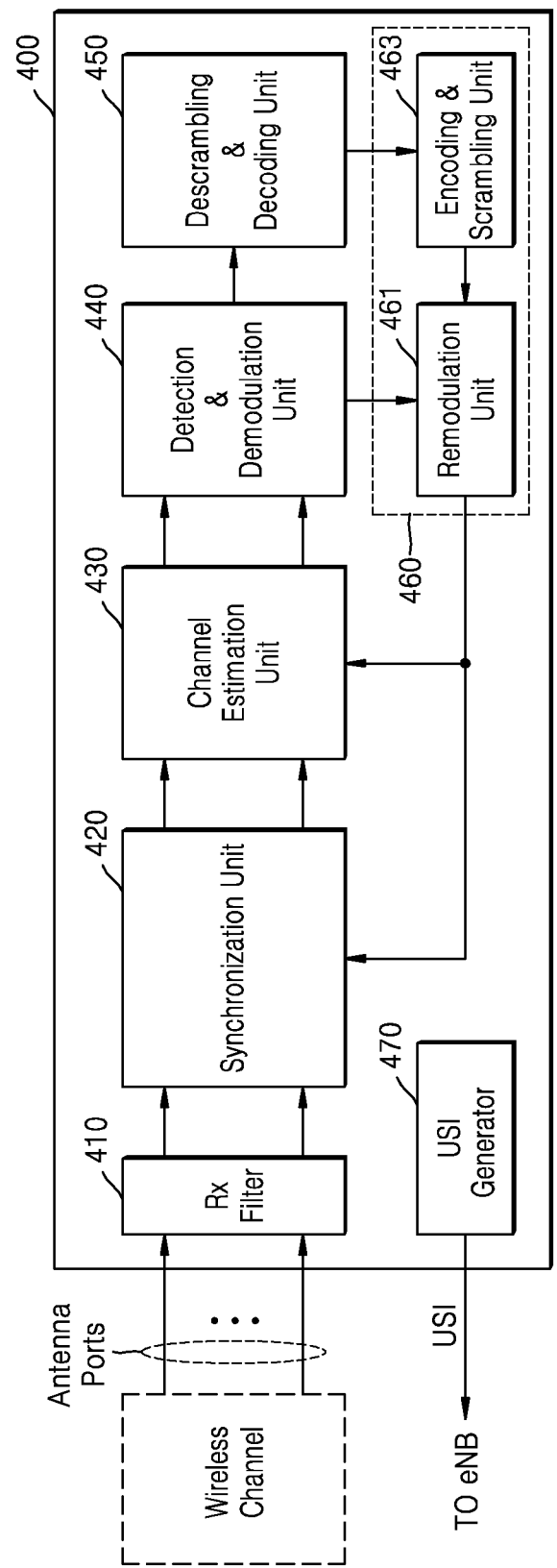
FIG. 11 is a block diagram of a receiver of a UE, according to example embodiments.

FIG. 11 is a block diagram of a receiver of a UE, according to example embodiments.

Referring to FIG. 11, a UE (e.g. UE 20) may include a receiver 400. The receiver 400 may include an Rx filter 410, a synchronization unit 420, a channel estimation unit 430, a detection & demodulation unit 440, a descrambling & decoding unit 450, a virtual pilot generator 460, and a USI generator 470. In example embodiments, each of the Rx filter 410, the synchronization unit 420, the channel estimation unit 430, the detection & demodulation unit 440, the descrambling & decoding unit 450, the virtual pilot generator 460, and the USI generator 470 may be implemented as software modules stored in a memory and executed by a processor to implement the functions described herein. In example embodiments, each of the Rx filter 410, the synchronization unit 420, the channel estimation unit 430, the detection & demodulation unit 440, the descrambling & decoding unit 450, the virtual pilot generator 460, and the USI generator 470 may be implemented using circuitry that is physically structured to execute the functions described herein.

The Rx filter 410 may filter only signals of frequencies that may be received and processed by the UE among downlink signals received from antenna ports of a base station through a wireless channel. When the UE has access to a cell for the first time so as to perform hand-over from a current cell to a new cell, or cell re-selection, the synchronization unit 420 may perform a cell search using synchronization signals included in the filtered downlink signals (e.g., primary synchronous signals (PSSs) and secondary synchronous signal (SSSs)). The synchronization unit 420 may perform frequency and symbol synchronization acquisition of the cell, downlink frame synchronization acquisition of the cell and determination of a cell identifier (ID) through the cell search using the synchronization signals.

The channel estimation unit 430 may perform channel estimation on the synchronized downlink signals. In example embodiments, the downlink signals may contain a data symbol. The channel estimation unit 430 may use pilot signals to generate first channel values of resource elements onto which pilot signals are mapped. The channel estimation unit 430 may also estimate a second channel value of a determined physical channel using the first channel values. In example embodiments, the channel estimation unit 430 may estimate the second channel value by interpolating two or more first channel values.

The detection & demodulation unit 440 may detect the determined physical channel using downlink channel estimation and may demodulate a detection value of the physical channel. An operation of detecting a physical channel may include an operation of acquiring an estimated data symbol of the physical channel using the second estimated channel value. In example embodiments, the detection value of the physical channel may represent the acquired estimated data symbol. Detailed descriptions thereof will be provided in FIGS. 14A to 14C. The descrambling & decoding unit 450 may descramble the demodulated detection value of the physical channel and may perform decoding to acquire a data symbol transmitted from the base station to the UE.

Hereinafter, an operation of generating virtual pilot signals will be described. The virtual pilot generator 460 may include a re-modulation unit 461 and an encoding & scrambling unit 463. In example embodiments, each of the re-modulation unit 461 and the encoding & scrambling unit 463 may be implemented as software modules stored in a memory and executed by a processor to implement the functions described herein. In example embodiments, each of the re-modulation unit 461 and the encoding & scrambling unit 463 may be implemented using circuitry that is physically structured to execute the functions described herein. A determined physical channel may include at least one of a PBCH, a PCFICH, a PHICH, a PDCCH, and a PDSCH. The encoding & scrambling unit 463 may receive a data symbol corresponding to the determined channel from the descrambling & decoding unit 450, may encode the data symbol and may scramble the data symbol. The re-modulation unit 461 may re-modulate the encoded and scrambled data symbol to generate virtual pilot signals and to provide the generated virtual pilot signals to the channel estimation unit 430. In example embodiments, the re-modulation unit 461 may receive a detection value of the physical channel modulated by the detection & demodulation unit 440 and may re-modulate the detection value to generate virtual pilot signals. The channel estimation unit 430 may perform channel estimation using the virtual pilot signals and the downlink signals to generate a third channel value corresponding to the determined physical channel. In example embodiments, the third channel value is a relatively accurate channel value corresponding to the determined physical channel. In example embodiments, the third channel value may be used to recover data corresponding to the determined physical channel.

The channel estimation unit 430 may estimate channel values of other physical channels using the third channel value and the pilot signals, as described further below. By using virtual pilot signals in combination with pilot signals the total number of pilot signals is increased, thus improving the estimating performance of a receiver channel without reducing the data transmission rate. Furthermore, the synchronization unit 420 may receive virtual pilot signals from the virtual pilot generator 460 and may perform frequency and timing synchronization using the virtual pilot signals so that a synchronization performance may be improved.

The USI generator 470 may generate USI including at least one of movement speed information of a UE and multi-path channel delay information of the UE. The USI generator 470 may generate the movement speed information by measuring movement speed of the UE within a cell of a base station eNB. Also, the USI generator 470 may generate multi-path channel delay information about DLSs received through different base stations or relay apparatuses or reflected from a sculpture such as a building and received therefrom, using RMS delay spread based on a power delay profile or maximum excess delay. The USI generator 470 may generate USI periodically or aperiodically and may provide the generated USI to the base station eNB. However, a block configuration of the receiver 400 of the UE illustrated in FIG. 11 just represents example embodiments. Thus, example embodiments are not limited thereto, and the receiver 400 may have various block configurations according to various communication protocols.

In this way, when performing channel estimation of physical channels, a UE may generate virtual pilot signals using a determined physical channel and may perform a channel estimation operation on the virtual pilot signals together with pilot signals so that a channel estimation operation having improved reliability may be performed.

Figure 12:
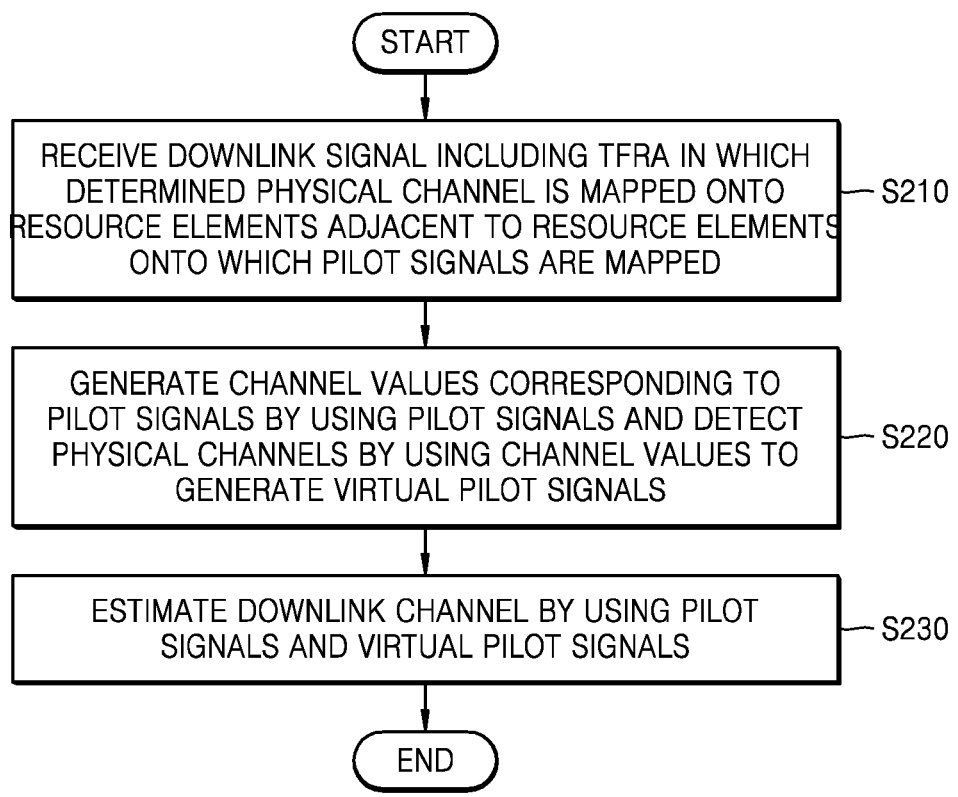
FIG. 12 is a flowchart illustrating methods of estimating physical channels by using virtual pilot signals, according to example embodiments.

FIG. 12 is a flowchart illustrating methods of estimating a physical channel using virtual pilot signals, according to example embodiments.

Referring to FIG. 12, a UE may receive a downlink signal including a TFRA in which physical channels used to generate virtual pilot signals are mapped onto resource elements adjacent to resource elements onto which pilot signals are mapped, from a base station (S210). The UE may generate channel values corresponding to the pilot signals using the pilot signals and may detect a determined physical channel using the generated channel values and generate virtual pilot signals using the result of detection (S220). Subsequently, the UE may estimate a downlink channel on other physical channels in a transmission area onto which the pilot signals and the physical channels are mapped, using the pilot signals and the virtual pilot signals (S230).

Figure 13:
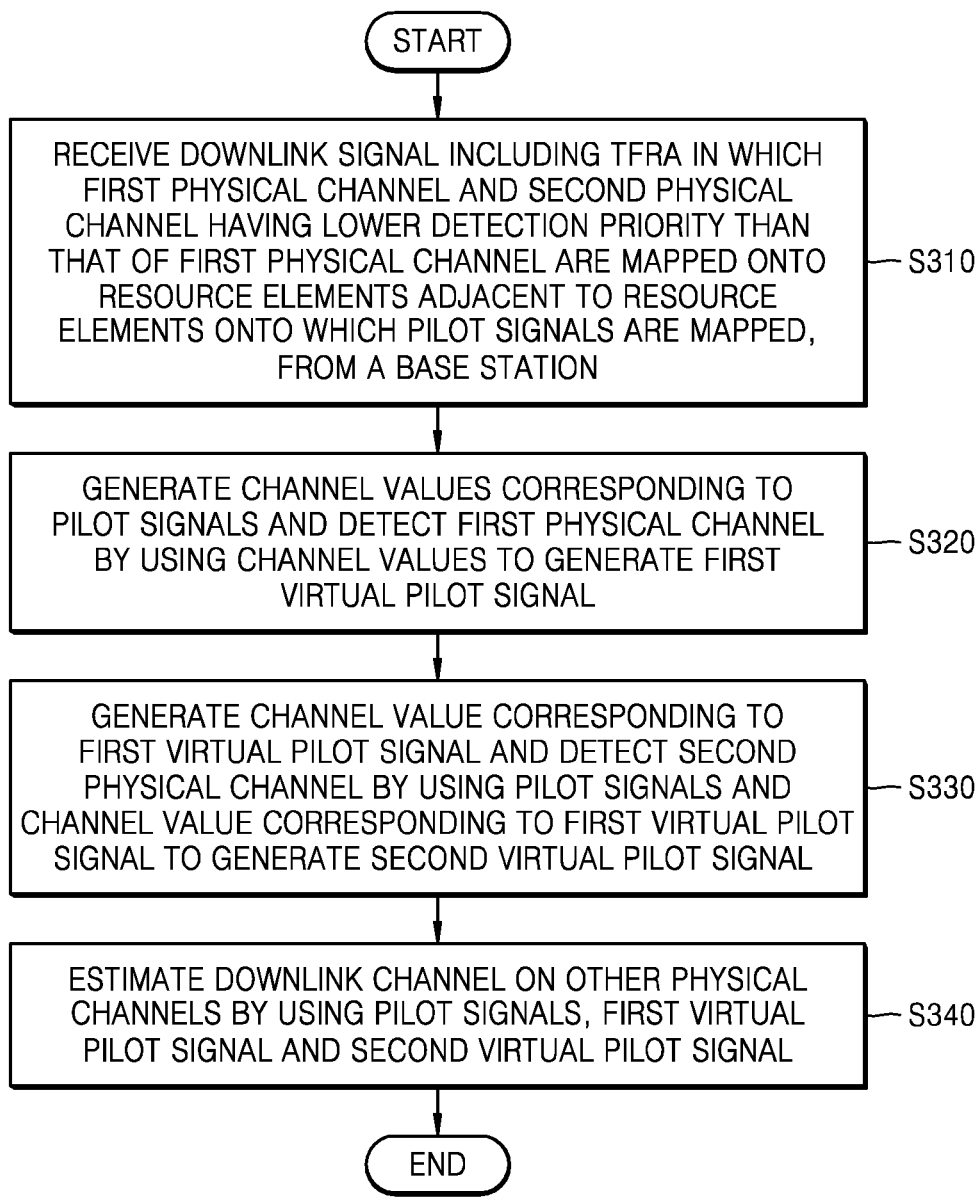
FIG. 13 is a flowchart illustrating methods of estimating first and second physical channels by using first and second virtual pilot signals, according to example embodiments.

FIG. 13 is a flowchart illustrating methods of estimating first and second physical channels using first and second virtual pilot signals, according to example embodiments.

Referring to FIG. 13, a UE may receive a downlink signal including a TFRA in which a first physical channel and a second physical channel having a lower detection priority than that of the first physical channel are mapped onto resource elements adjacent to resource elements onto which pilot signals are mapped, from a base station (S310). The UE may generate channel values corresponding to pilot signals and may detect a first physical channel using the channel values to generate a first virtual pilot signal (S320). The UE may generate a channel value corresponding to the first virtual pilot signal and may detect a second physical channel using the pilot signals and the channel value corresponding to the first virtual pilot signal to generate a second virtual pilot signal (S330). The UE may estimate a downlink channel on other physical channels using the pilot signals, the first virtual pilot signal and the second virtual pilot signal (S340).

Figure 14A:
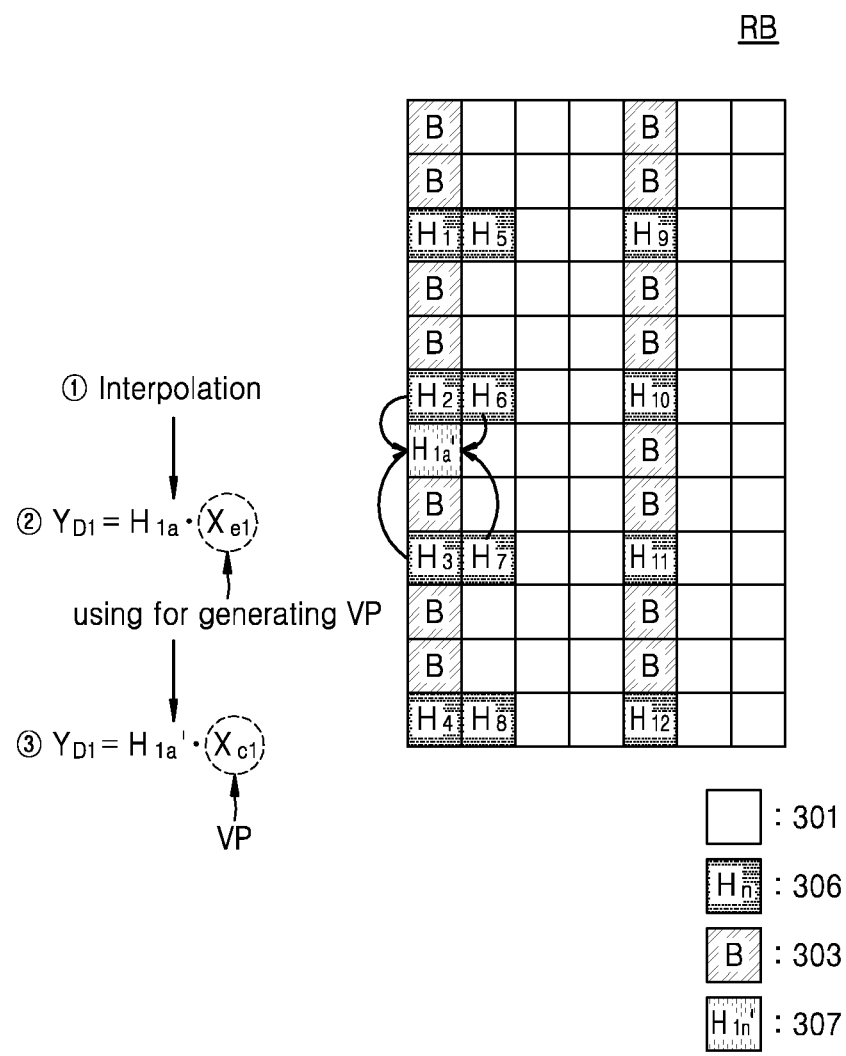
FIGS. 14A to 14C are resource block schematics that illustrate methods of generating virtual pilot signals by using a first physical channel and performing channel estimation using the virtual pilot signals, according to example embodiments.
Figure 14B:
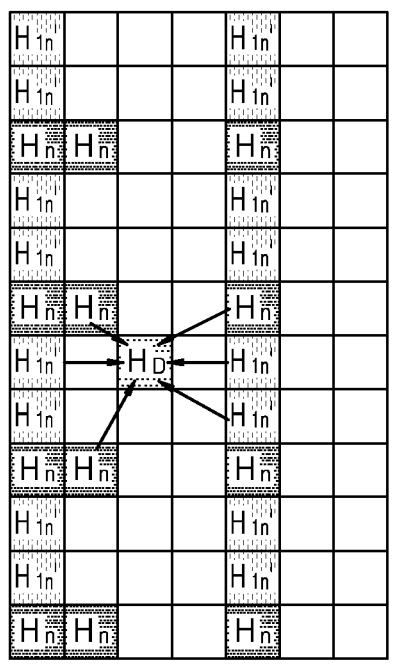
Figure 14C:
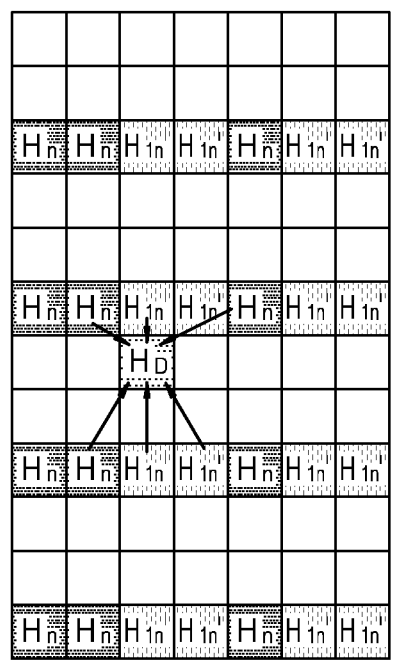

FIGS. 14A to 14C are resource block schematics that illustrate methods of generating virtual pilot signals using a first physical channel and performing channel estimation using the virtual pilot signals, according to example embodiments.

Referring to FIG. 14A, example embodiments provide an operation of generating virtual pilot (VP) signals using a first physical channel 303 when a UE receives a downlink signal including a resource block RB having a plurality of resource elements onto which the first physical channel 303 is mapped.

Referring to FIG. 14A, the UE may generate channel values Hn corresponding to pilot signals 306 using the pilot signals 306. Hereinafter, a selected first physical channel 307 corresponds to one among a plurality of first physical channels 303 selected to describe an operation of generating virtual pilot (VP) signals. According to example embodiments, in order to generate virtual pilot signals on the selected first physical channel 307, the UE may generate a channel estimation value H1a of the selected first physical channel 307 by performing interpolation on channel values H2, H3, H6, and H7. The UE may acquire a received data symbol YD1 that passes through a wireless channel and an estimated data symbol Xe1 using the channel estimation value H1a corresponding to the selected first physical channel 307. As described above in FIG. 11, the UE performs operations such as modulation, descrambling, and decoding on the estimated data symbol Xe1 so that a data symbol Xc1 correlated with a data symbol transmitted by the base station through antenna ports may be acquired. As discussed further in association with FIG. 11, operations such as encoding, scrambling and re-modulating may be performed on the data symbol Xc1 to generate virtual pilot (VP) signals. The UE may generate a channel value H1a' corresponding to the selected first physical channel 307 that is relatively accurate using the VP signals and the received data symbol YD1. In example embodiments, the UE may use the channel value H1a' to recover data corresponding to the first physical channel.

Referring to FIG. 14B, when the first physical channel 303 is mapped onto the TFRA using the frequency-axis-based resource mapping patterns illustrated in FIG. 7A, the UE may generate a relatively accurate channel value H1n' corresponding to the first physical channel 307 using virtual pilot signals in the manner described above in FIG. 14A. The UE may estimate a channel value HD of a resource element 308 onto which other physical channels are mapped, using the channel values Hn corresponding to the pilot signals 306 and the channel value H1n' corresponding to the first physical channel 307. Thus, even when there is a downlink reception path that exceeds a channel delay threshold value, the UE may perform channel estimation with high reliability.

Referring to FIG. 14C, when the first physical channel 303 is mapped onto the TFRA using the time-axis-based resource mapping patterns illustrated in FIG. 7B, the UE may generate a relatively accurate channel value H1n' corresponding to the first physical channel 307 using the virtual pilot signals in the manner described above in FIG. 14A. The UE may estimate a channel value HD corresponding to other physical channels using the channel values Hn corresponding to the pilot signals 306 and the channel value H1 n' corresponding to the first physical channel 307. Thus, even when the UE moves at a movement speed that exceeds a movement speed threshold value, channel estimation having high reliability may be performed.

Figure 15A:
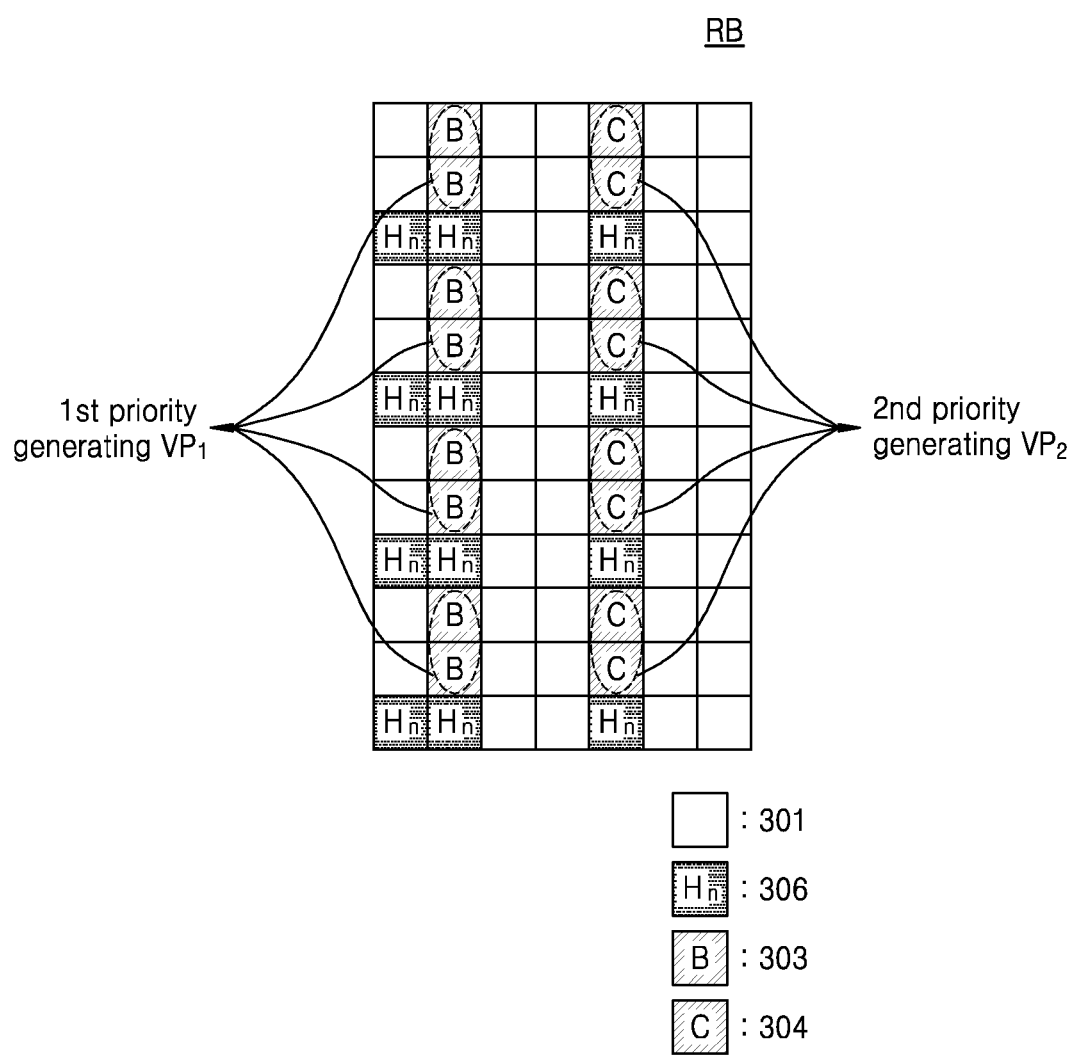
Figure 15B:
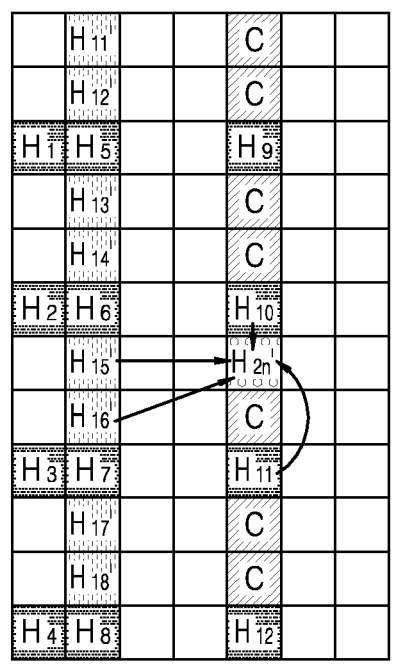
Figure 15C:
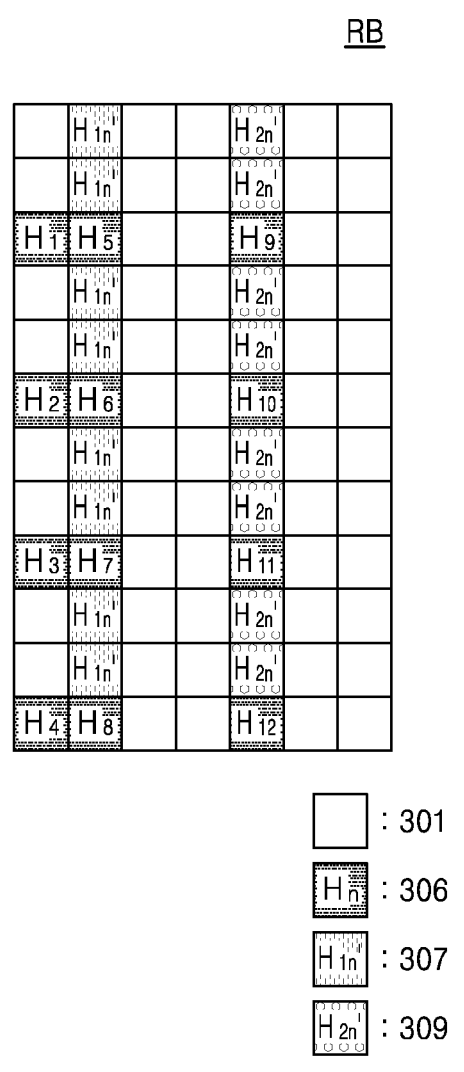

FIGS. 15A to 15C are resource block schematics that illustrate methods of generating virtual pilot signals by using a first physical channel and a second physical channel and performing channel estimation using the virtual pilot signals, according to example embodiments.

Referring to FIG. 15A, example embodiments provide an operation of generating a first virtual pilot signal VP1 and a second virtual pilot signal VP2 when the UE receives a downlink signal including a resource block RB having a plurality of resource elements onto which a first physical channel 303 is mapped, and a plurality of resource elements onto which a second physical channel 304 is mapped.

Referring to FIG. 15A, the UE may detect the first physical channel 303 prior to the second physical channel 304 using a channel value Hn corresponding to pilot signals 306 and may generate a first virtual pilot signal VP1 using the result of detection. Subsequently, the UE may detect the second physical channel 304 using the channel value Hn corresponding to the pilot signals 306 and the first virtual pilot signal VP1 and may generate the second virtual pilot signal VP2 using the result of detection. In example embodiments, an operation of detecting a physical channel may include an operation of acquiring an estimated data symbol of the physical channel.

Referring to FIG. 15B, the UE may generate a channel value H1n' corresponding to the first physical channel 307 using the first virtual pilot signal VP1 in the manner similar to that described above in FIG. 14A.

Hereinafter, a selected second physical channel 309 corresponds to one among a plurality of second physical channels 304 selected to describe an operation of generating virtual pilot (VP) signals. According to example embodiments, the UE may generate a channel estimation value H2a corresponding to the selected second physical channel 309 by performing interpolation on channel values H10, H11, H15', and H16' so as to detect the selected second physical channel 309 mapped onto a second resource element. The UE may acquire an estimated data symbol Xe2 using a received data symbol YD2 that passes through the wireless channel and a channel estimation value H2a corresponding to the selected second physical channel 309. As described above in association with in FIG. 11, operations such as demodulation, descrambling, and decoding may be performed on the estimated data symbol Xe2 so that a data symbol Xc2 correlated to a data symbol transmitted by the base station through antenna ports may be acquired. As discussed further in association with FIG. 11, operations such as encoding, scrambling and re-modulating may be performed on the data symbol Xc2 to generate a second virtual pilot signal VP2. The UE may generate a relatively accurate channel value H2a' of the selected second physical channel 309 using the second virtual pilot signal VP2 and the received data symbol YD2.

Referring to FIG. 15C, the UE may generate a relatively accurate value H2n' of a channel corresponding to the selected second physical channel 309 using the second virtual pilot signal VP2 in the manner described above in FIG. 15B. The UE may estimate channel values of resource elements 301 onto which other physical channels are mapped, using the channel value Hn corresponding to the pilot signals 306, a channel value H1n' corresponding to the selected first physical channel 307, and a channel value H2n' corresponding to the selected second physical channel 309.

The wireless communication systems according to example embodiments may perform channel estimation having high reliability using a plurality of virtual pilot signals.

Figure 16:
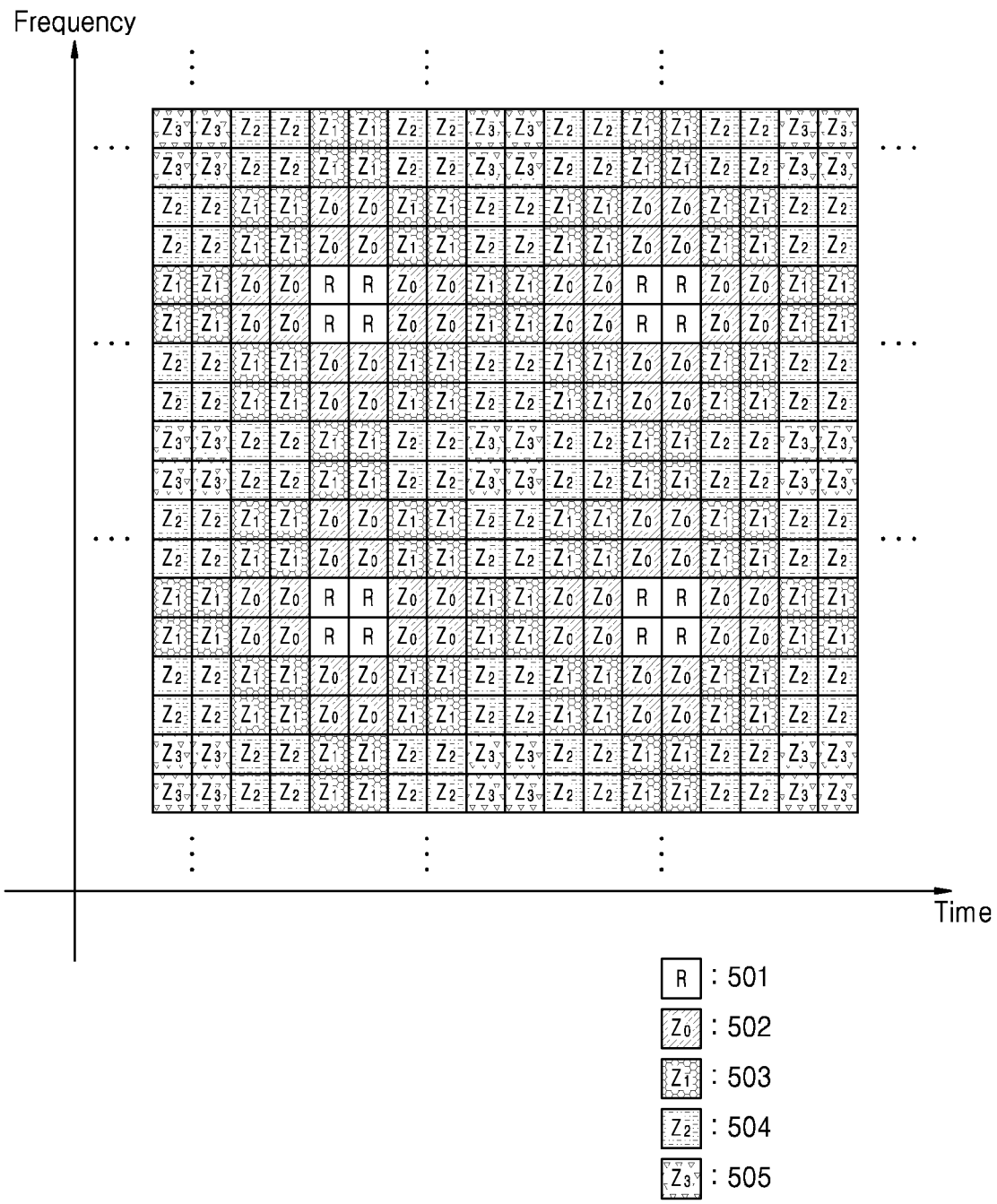
FIG. 16 is a resource block schematic that illustrates resource mapping methods according to detection priorities of physical channels, according to example embodiments.

FIG. 16 is a resource block schematic that illustrates resource mapping methods according to detection priorities of physical channels, according to example embodiments.

Referring to FIG. 16, physical channels may be classified into a first physical channel, a second physical channel, a third physical channel, and a fourth channel according to detection priorities of the physical channels of a UE. According to example embodiments, a base station may perform a resource mapping operation in the order of the first physical channel, the second physical channel, the third physical channel, and the fourth physical channel based on the detection priorities.

Also, the base station may map the first physical channel, the second physical channel, the third physical channel, and the fourth physical channel onto resource elements excluding resource elements onto which pilot signals are mapped, in a TFRA. According to example embodiments, the base station may map the first physical channel onto at least one resource element in an area 502 most adjacent to the resource elements onto which pilot signals 501 are mapped, based on the detection priorities. The base station may map the second physical channel onto at least one resource element in an area 503 secondly adjacent to the resource elements onto which the pilot signals 501 are mapped, based on the detection priorities. The base station may map the third physical channel onto at least one resource element in an area 504 thirdly adjacent to the resource elements onto which the pilot signals 501 are mapped, based on the detection priorities. The base station may map the fourth physical channel onto at least one resource element in an area 505 fourthly adjacent to the resource elements onto which the pilot signals 501 are mapped, based on the detection priorities. That is, the base station may perform a resource mapping operation by changing a degree of adjacency with the resource elements onto which pilot signals 501 are mapped, in the order of the first physical channel, the second physical channel, the third physical channel, and the fourth physical channel based on the detection priorities. The base station may map other physical channels onto any remaining resource elements.

According to example embodiments, the first physical channel may be a PBCH, the second physical channel may be a PCFICH, the third physical channel may be a PHICH, and the fourth physical channel may be a PDCCH. According to example embodiments, when the detection priorities are arbitrarily set to a plurality of PDSCHs, and a first PDSCH and a second PDSCH, having a lower detection priority than that of the first PDSCH, are classified to be distinguished from each other, the first physical channel may be a PBCH, the second physical channel may be a PDCCH, the third physical channel may be a first PDSCH, and the fourth physical channel may be a second PDSCH. However, these are just example embodiments. Thus, example embodiments are not limited thereto, and more or less types of physical channels may be mapped based on detection priorities.

In resource mapping methods based on detection priorities of a base station according to example embodiments, physical channels may be mapped adjacent to resource elements onto which pilot signals are mapped, based on the detection priorities so that virtual pilot signals may be sequentially generated using the physical channels. Thus, channel estimation having high reliability may be effectively performed.

Figure 17:
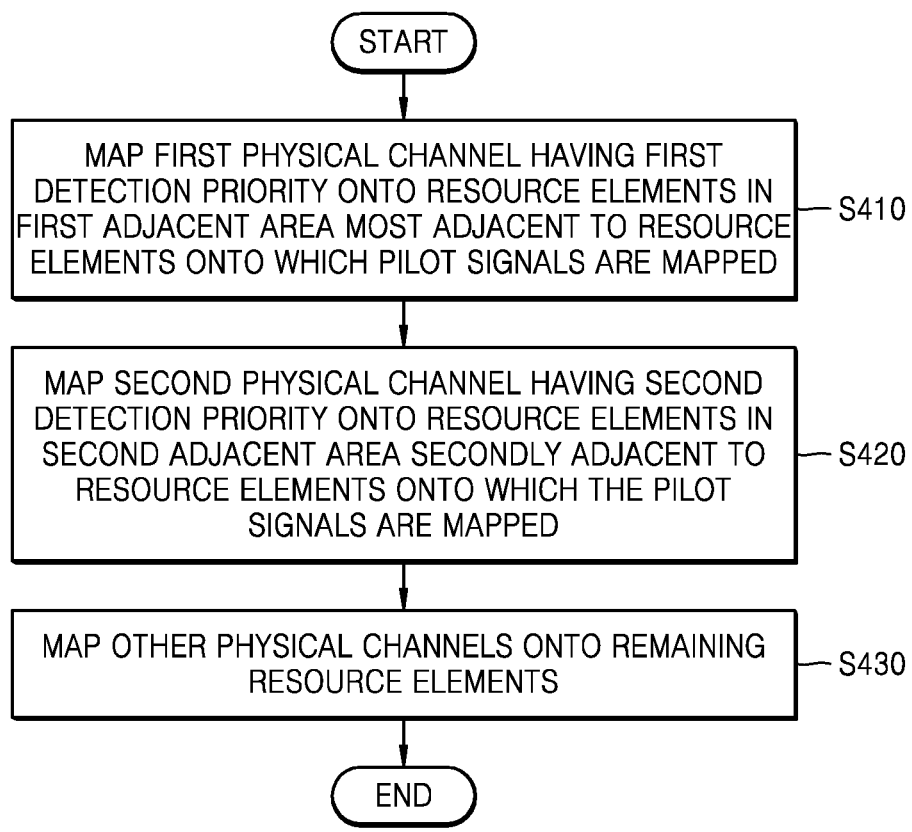
FIG. 17 is a flowchart illustrating resource mapping methods according to detection priorities of physical channels, according to example embodiments.

FIG. 17 is a flowchart illustrating resource mapping methods according to detection priorities of physical channels, according to example embodiments.

Referring to FIG. 17, a base station may map a first physical channel having a first detection priority onto resource elements in a first adjacent area most adjacent to resource elements onto which pilot signals are mapped (S410). The base station may map a second physical channel having a second detection priority onto resource elements in a second adjacent area secondly adjacent to the resource elements onto which the pilot signals are mapped (S420). The base station may map other physical channels onto the remaining resource elements (S430).

Figure 18:
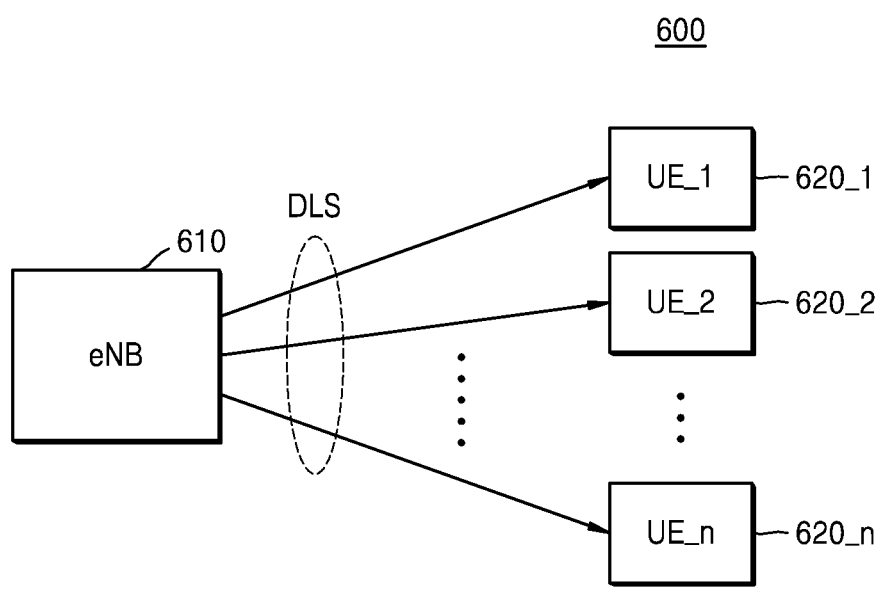
FIG. 18 is a block diagram illustrating methods of detecting which physical channels have resource mapping patterns that have been changed by a determined UE in a wireless communication system including a plurality UEs according to example embodiments.

FIG. 18 is a block diagram illustrating methods of detecting which physical channels have resource mapping patterns that have been changed by a determined UE in a wireless communication system including a plurality UEs according to example embodiments.

Referring to FIG. 18, a wireless communication system 600 may include a base station 610 and a plurality of UEs 620_1 to 620_n within a cell coverage of the base station 610. Hereinafter, it is assumed that resource mapping patterns of physical channels used to generate virtual pilot signals are changed using the method described in association with FIG. 1 based on state information of a first UE 620_1. The other UEs 620_2 to 620_n detect which physical channels included in the DLS have changed resource mapping patterns, so that a communication operation with the base station 610 may be performed.

First, when physical channels are PBCHs, according to example embodiments, the other UEs 620_2 to 620_n may perform a detection operation of the PBCHs in consideration of the number of changeable resource mapping patterns of the PBCHs. That is, the other UEs 620_2 to 620_n may perform a blind detection operation corresponding to each of the changeable resource mapping patterns of the PBCHs a plurality of times, thereby detecting the PBCHs. According to example embodiments, when the resource mapping patterns of the PBCHs are changed, the base station 610 may provide change information to the other UEs 620_2 to 620_n based on the state information of the first UE 620_1 separately. In example embodiments, the base station 610 may provide PBCH transmission format information that represents the changed resource mapping patterns of the PBCHs through a physical channel such as a PCFICH or a newly-added physical channel, such as a physical broadcast format indicator channel (PBFICH), and the other UEs 620_2 to 620_n may detect the PBCHs based on the PBCH transmission format information. Also, the base station 610 may change the resource mapping patterns of the PBCHs at a determined cycle and may allocate resources to the other UEs 620_2 to 620_n in accordance with the determined cycle so that the other UEs 620_2 to 620_n may detect the PBCHs.

When the physical channels are control channels having UE-specific characteristics such as PDCCHs or EPDCCHs, e.g., when it is assumed that the physical channels are PDCCHs with respect to the first UE 620_1, the base station 610 may provide timing information about changing the resource mapping patterns of the PDCCHs to the first UE 620_1 through a higher level message. According to example embodiments, the higher level message may be a radio resource control (RRC) message. According to example embodiments, the base station 610 may provide the changed resource mapping patterns of the PDCCHs to UEs 620_1 to 620_n through a separate physical channel, and each of the UEs 620_1 to 620_n may detect the PDCCHs based on this. According to example embodiments, the UEs 620_1 to 620_n may perform a detection operation on the PDCCHs in consideration of the number of changeable resource mapping patterns of the PDCCHs. That is, the UEs 620_1 to 620_n may perform a blind detection operation corresponding to each of the changeable resource mapping patterns of the PDCCHs a plurality of times so that the PDCCHs may be detected.

However, the above-described methods of detecting the physical channels having the changed resource mapping patterns using the other UEs 620_2 to 620_n are just example embodiments, and example embodiments are not limited thereto, and various example embodiments may be applied according to types of physical channels.

Figure 19:
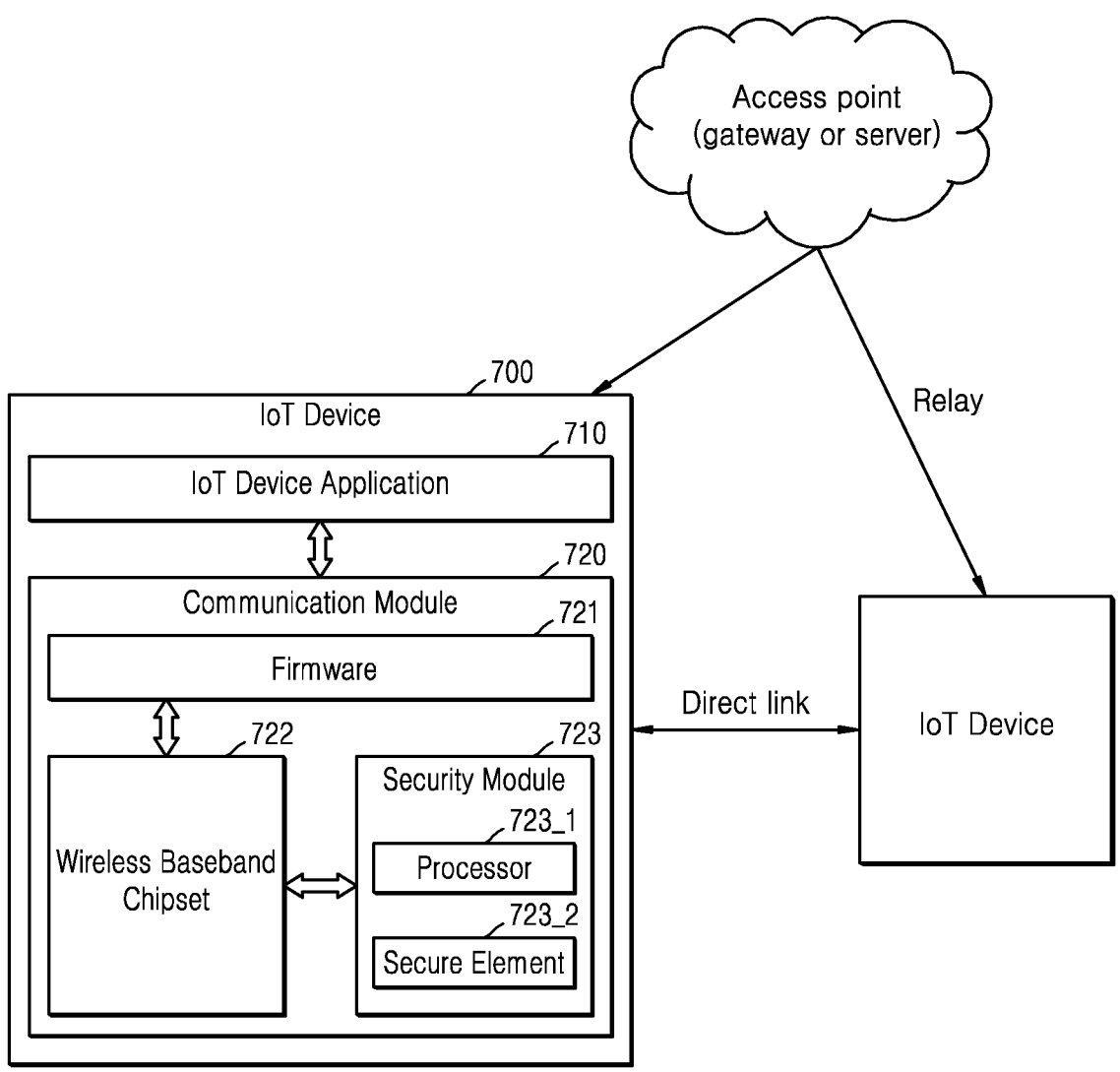
FIG. 19 is a block diagram illustrating operating methods applied to Internet of Things (IoT) devices, according to example embodiments.

FIG. 19 is a block diagram illustrating operating methods applied to Internet of things (IoT) devices according to example embodiments.

IoT may refer to a network between devices using wired/wireless communications. Also, an IoT device may include devices that have accessible wired or wireless interfaces and transmit or receive data by communicating with at least one other device via the wired/wireless interfaces. According to example embodiments, the IoT device may take the form of various types of communication devices including a refrigerator, an air conditioner, a telephone, an automobile, and the like. The above-described example embodiments may be applied to the IoT, and according to example embodiments, the above-described base stations may take the form of an access point (AP), a gateway, a server, and the like in the IoT. Also, the above-described UEs may take the form of IoT devices in the IoT.

Referring to FIG. 19, an IoT device 700 may include an IoT device application 710 and a communication module 720. The communication module 720 may include a firmware 721, a wireless base band chip set 722, and a security module 723.

The IoT device application 710 as a software component may control the communication module 720 and may be executed by a central processing unit (CPU) (not shown) in the IoT device. The IoT device application 710 may be stored in a memory (not shown) in the IoT device. The communication module 720 may include a wireless communication component that has access to or may transmit or receive data to or from a local area network (LAN), a wireless LAN (WLAN) such as wireless fidelity (Wi-Fi), a wireless universal serial bus (USB), Zigbee, or a mobile communication network. The communication module 720 may be implemented using circuitry that is physically structured to execute the operations described herein.

The firmware 721 may provide an application programming interface (API) and may control the wireless base band chip set 722 according to the instructions of the IoT device application 710. In example embodiments, the firmware 721 may be stored in a memory and executed by a central processing unit (CPU) (not shown) in the IoT device. The wireless base band chip set 722 may provide connectivity to a wireless communication network. The wireless base band chip set 722 may be implemented using circuitry that is physically structured to execute the operations described herein.

The security module 723 may include a processor 723_1 and a security element 723_2. In example embodiments, the security module 723 may be implemented as a software module stored in a memory and executed by a processor, such as processor 723_1, to implement the functions described herein. In example embodiments, the security module 723 may be implemented using circuitry that is physically structured to execute the functions described herein. Security element 723_2 may be implemented using computer-readable instructions, circuitry, or a combination thereof. In example embodiments, security element 723_2 may store authenticating information such as a password, identifier, code, key, or token. The security module 723 may authenticate the IoT device 700 so as to facilitate access to the wireless communication network and may authenticate the IoT device 700 to facilitate access to a wireless network service.

Meanwhile, according to the above-described example embodiments, the AP may map physical channels onto a TFRA using various resource mapping methods and may provide a downlink signal including the physical channels to the IoT device 700. The IoT device 700 may generate virtual pilot signals using a determined physical channel and may perform a downlink channel estimation operation using the virtual pilot signals.

While example embodiments have been particularly shown and described, it will be understood that various changes in form and details may be made therein without departing from the spirit and scope of the following claims.

What is claimed is:

1. A method of operating a wireless communication system performed at a base station, the method comprising:
   determining, using at least one processor, a first resource mapping pattern of a first physical channel based on state information of a user equipment (UE) and reference resource elements among a plurality of resource elements in a time-frequency resource area (TFRA), a plurality of pilot signals being mapped to the reference resource elements, the first resource mapping patterns being used to generate virtual pilot signals, the state information of the UE including at least one of motion information of the UE or channel delay information of the UE, the determining the first resource mapping pattern includes determining a density of first data resource elements among the plurality of resource elements on at least one of a frequency axis of the TFRA or a time axis of the TFRA based on the state information;
   mapping, using the at least one processor, the first physical channel onto the first data resource elements based on the first resource mapping patterns; and
   transmitting, using the at least one processor, a downlink signal including the TFRA to the UE.

2. The method of claim 1, wherein the state information of the UE includes at least one of movement speed information of the UE or multi-path channel delay information of the UE.

3. The method of claim 2, wherein the determining the first resource mapping pattern of the first physical channel includes:
   determining the density of the first data resource elements to be greater on the time axis than on the frequency axis in response to the state information of the UE including the movement speed information of the UE indicating a speed of the UE exceeds a movement speed threshold value.

4. The method of claim 2, wherein the determining the first resource mapping pattern of the first physical channel includes:
   determining the density of the first data resource elements to be greater on the frequency axis than on the time axis in response to the state information of the UE including the multi-path channel delay information of the UE indicating a degree of channel delay caused by multi-paths of the UE exceeds a channel delay threshold value.

5. The method of claim 1, further comprising:
   determining a second resource mapping pattern of a second physical channel based on the plurality of pilot signals and the state information, the second resource mapping pattern being used to generate the virtual pilot signals,
   wherein the first resource mapping pattern is determined in every first period and the second resource mapping pattern is determined in every second period.

6. The method of claim 5, wherein the first physical channel has a higher detection priority than that of the second physical channel at the UE.

7. The method of claim 5, wherein the first physical channel is mapped onto the first data resource elements closer to the reference resource elements than second resource elements among the plurality of resource elements onto which the second physical channel is mapped according to the first resource mapping pattern and the second resource mapping pattern.

8. The method of claim 5, wherein the first period is different from the second period.

9. The method of claim 8, wherein the mapping of the first physical channel includes:
   mapping each of the first physical channel and the second physical channel onto the TFRA based on the first resource mapping pattern and the second resource mapping pattern different from the first resource mapping pattern.

10. The method of claim 1, wherein the pilot signals include at least one of cell-specific reference signals (CRSs), demodulation reference signals (DM-RSs), multicast-broadcast single-frequency network (MBFSN) reference signals, or position measurement reference signals.

11. A method of operating a wireless communication system performed by a communication device, the method comprising:
    receiving, using at least one processor, a downlink signal from a base station, the downlink signal including a transmission area including a plurality of resource elements, the plurality of resource elements including first data resource elements onto which a first physical channel is mapped and reference resource elements onto which a plurality of pilot signals are mapped, the first data resource elements being mapped based on the reference resource elements in a direction of a frequency axis or a direction of a time axis;
    generating, using the at least one processor, a reference channel value using the plurality of pilot signals;
    detecting, using the at least one processor, the first physical channel using the reference channel value to acquire an estimated data symbol;
    generating, using the at least one processor, a first virtual pilot signal using the estimated data symbol;
    estimating, using the at least one processor, a downlink channel in the transmission area by using the pilot signals and the first virtual pilot signal to obtain a first channel value of the first physical channel;
    recovering, using the at least one processor, data of the first physical channel based on the estimating; and
    detecting a second physical channel by using the reference channel value and the first channel value.

12. The method of claim 11, wherein the estimating the downlink channel includes:
generating the first channel value by using the first virtual pilot signal; and
estimating the downlink channel by using the reference channel value and the first channel value.

13. The method of claim 11, further comprising:
generating the first channel value by using the first virtual pilot signal; and
generating at least one second virtual pilot signal based on the detecting the second physical channel,
wherein the transmission area includes second data resource elements among the plurality of resource elements onto which the second physical channel having a lower detection priority than that of the first physical channel is mapped, the second data resource elements being mapped based on the reference resource elements in the direction of the frequency axis or the direction of the time axis.

14. The method of claim 13, further comprising:
estimating the downlink channel by using the pilot signals, the first virtual pilot signal, and the at least one second virtual pilot signal.

15. The method of claim 11, further comprising:
transmitting state information of a user equipment (UE) including at least one of movement speed information of the UE or multi-path channel delay information of the UE to the base station.

16. A method performed by a communication device, comprising:
receiving, using at least one processor, a first downlink signal containing a data symbol, wherein the first downlink signal includes at least one pilot signal and a first physical channel mapped to resource elements;
performing, using the at least one processor, channel estimation to obtain at least one first channel value of resource elements onto which the at least one pilot signal is mapped;
performing, using the at least one processor, channel estimation using the at least one first channel value to obtain a second channel value of the first physical channel;
acquiring, using the at least one processor, an estimated data symbol using the second channel value, wherein the estimated data symbol is an estimate of the data symbol contained in the first downlink signal;
generating, using the at least one processor, at least one virtual pilot signal using the estimated data symbol;
performing, using the at least one processor, channel estimation using the at least one virtual pilot signal and the first downlink signal to obtain at least one third channel value of the first physical channel; and
recovering, using the at least one processor, data of the first physical channel using the at least one third channel value.

17. The method of claim 16, further comprising:
transmitting state information of a user equipment (UE) including at least one of movement speed information of the UE or multi-path channel delay information of the UE to a base station; and
receiving a second downlink signal including resource elements mapped according to the state information of the UE.

18. The method of claim 16, wherein performing channel estimation using the at least one first channel value to obtain the second channel value of the first physical channel includes performing interpolation between two or more values of the at least one first channel value.

19. The method of claim 16, further comprising:
performing channel estimation using the at least one first channel value and the at least one third channel value to obtain at least one fourth channel value of a second physical channel; and
using the at least one fourth channel value to recover data of the second physical channel,
wherein the first downlink signal further includes the second physical channel mapped to resource elements.

20. The method of claim 19, wherein the performing channel estimation using the at least one first channel value and the at least one third channel value to obtain at least one fourth channel value of the second physical channel includes performing interpolation between two or more of the at least one first channel value and the at least one third channel value.

* * * * *